(12) United States Patent
Chung et al.

(10) Patent No.: US 11,678,221 B2
(45) Date of Patent: Jun. 13, 2023

(54) ELECTRONIC DEVICE SUPPORTING DUAL CONNECTIVITY AND METHOD OF OPERATING THE SAME

(71) Applicant: Samsung Electronics Co., Ltd., Suwon-si (KR)

(72) Inventors: Wonsuk Chung, Suwon-si (KR); Jongmin Baik, Suwon-si (KR); Sangho Lee, Suwon-si (KR); Taeseop Lee, Suwon-si (KR); Hyerim Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/839,967

(22) Filed: Apr. 3, 2020

(65) Prior Publication Data
US 2020/0329399 A1 Oct. 15, 2020

(30) Foreign Application Priority Data

Apr. 12, 2019 (KR) .................. 10-2019-0043171
Jun. 5, 2019 (KR) .................. 10-2019-0066847

(51) Int. Cl.
*H04W 76/15* (2018.01)
*H04W 28/06* (2009.01)
(Continued)

(52) U.S. Cl.
CPC .......... *H04W 28/06* (2013.01); *H04L 69/22* (2013.01); *H04L 69/322* (2013.01);
(Continued)

(58) Field of Classification Search
CPC .......... H04L 69/22; H04W 28/0278; H04W 36/0069; H04W 76/15; H04W 76/16; H04W 76/18; H04W 76/34; H04W 80/02
(Continued)

(56) References Cited

U.S. PATENT DOCUMENTS

2015/0181638 A1 6/2015 Tabet et al.
2015/0256300 A1 9/2015 Lin et al.
(Continued)

FOREIGN PATENT DOCUMENTS

EP 3753372 A1 12/2020
WO 2018172542 A1 9/2018
WO 2019160902 A1 8/2019

OTHER PUBLICATIONS

International Search Report and Written Opinion of the International Searching Authority in connection with International Application No. PCT/KR2020/004825 dated Jul. 30, 2020, 6 pages.
(Continued)

*Primary Examiner* — Harun Chowdhury

(57) ABSTRACT

An electronic device may include a first communication processor supporting first network communication with a first network, and a second communication processor supporting second network communication with a second network different from the first network. When both of the first network communication and the second network communication are set to a data transmittable state, the second communication processor may be configured to transmit transmission data based on the second network communication selected as a primary path from between the first network communication and the second network communication, when the size of the transmission data is less than a predetermined threshold. In response to detection of a failure in the second network communication, the first communication processor may be configured to transmit the transmission data based on the first network communication, irrespective of whether the size of the transmission data is equal to or larger than the predetermined threshold.

10 Claims, 21 Drawing Sheets

(51) Int. Cl.
  *H04W 36/00* (2009.01)
  *H04L 69/22* (2022.01)
  *H04L 69/322* (2022.01)
  *H04W 28/02* (2009.01)
  *H04W 80/02* (2009.01)
  *H04W 80/08* (2009.01)

(52) U.S. Cl.
  CPC ... *H04W 28/0278* (2013.01); *H04W 36/0069* (2018.08); *H04W 76/15* (2018.02); *H04W 80/02* (2013.01); *H04W 80/08* (2013.01)

(58) Field of Classification Search
  USPC .......................................... 370/216, 225, 329
  See application file for complete search history.

(56) References Cited

U.S. PATENT DOCUMENTS

| | | |
|---|---|---|
| 2016/0255537 A1 | 9/2016 | Uchino et al. |
| 2017/0013498 A1 | 1/2017 | Yi et al. |
| 2018/0035483 A1* | 2/2018 | Nagasaka ............. H04W 76/16 |
| 2018/0284741 A1 | 10/2018 | Cella et al. |
| 2018/0376383 A1 | 12/2018 | Belghoul et al. |
| 2019/0069308 A1 | 2/2019 | Lee et al. |
| 2019/0104560 A1* | 4/2019 | Nuggehalli ........... H04W 76/34 |
| 2019/0254100 A1* | 8/2019 | Yu ........................ H04W 76/18 |

OTHER PUBLICATIONS

European Search Report in connection with European Application No. 20166212.9 dated Sep. 7, 2020, 8 pages.
European Patent Office, "Communication pursuant to Article 94(3) EPC" dated Feb. 14, 2022, in connection with European Patent Application No. 20166212.9, 5 pages.

* cited by examiner

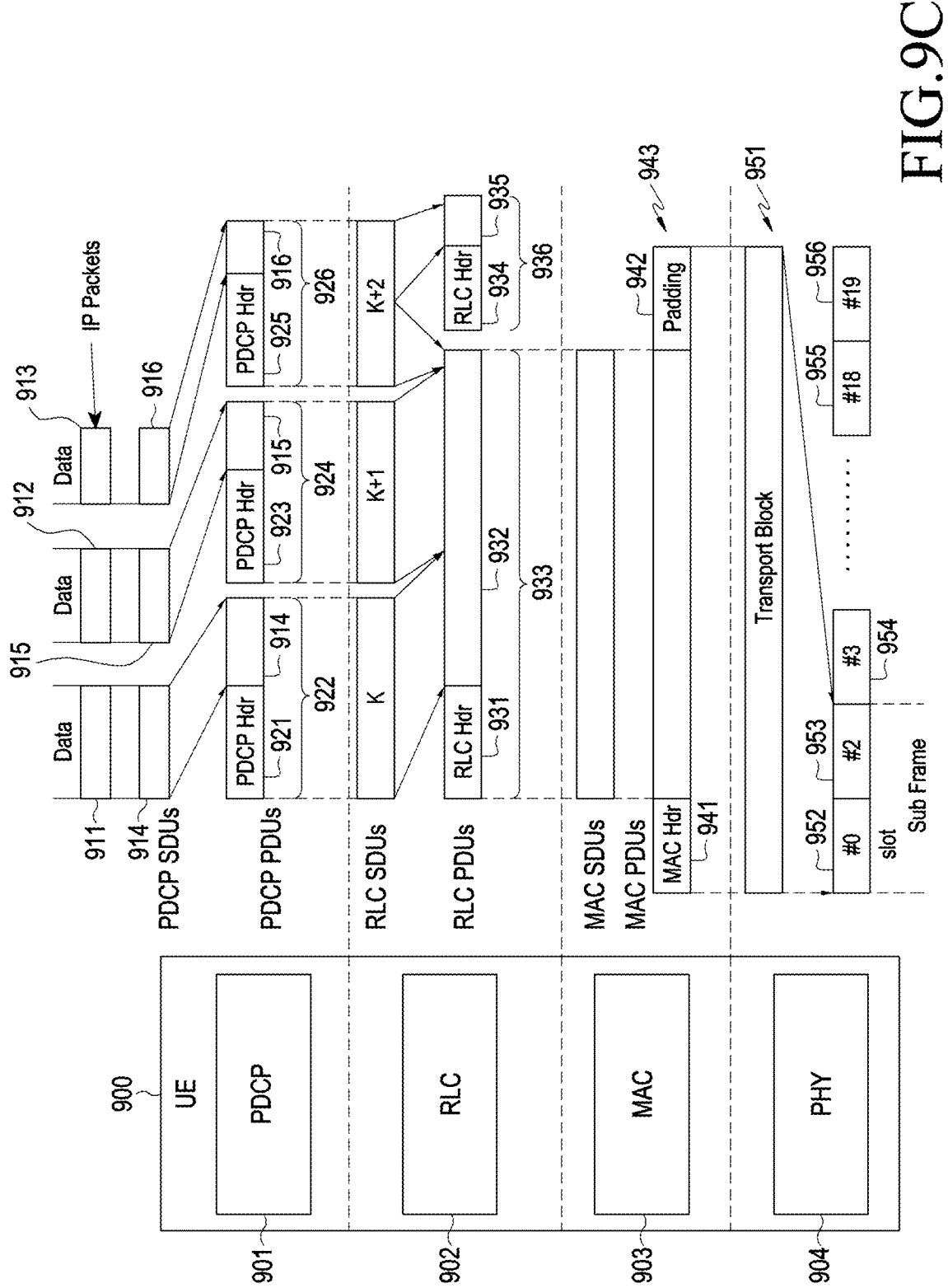

ELECTRONIC DEVICE SUPPORTING DUAL CONNECTIVITY AND METHOD OF OPERATING THE SAME

CROSS-REFERENCE TO RELATED APPLICATIONS

This application is based on and claims priority under 35 U.S.C. § 119 to Korean Patent Application No. 10-2019-0043171 filed on Apr. 12, 2019 and Korean Patent Application No. 10-2019-0066847 filed on Jun. 5, 2019 in the Korean Intellectual Property Office, the disclosures of which are herein incorporated by reference in their entirety.

BACKGROUND

1. Field

The disclosure relates to an electronic device supporting dual connectivity and a method of operating the same.

2. Description of Related Art

Along with the development of mobile communication technology, portable terminals equipped with various functions have recently become popular, and efforts have been made to develop $5^{th}$ generation (5G) communication systems to meet the increasing demands for wireless data traffic. In order to achieve high data rates, implementation of 5G communication systems in ultra-high frequency bands as well as in the high frequency bands used in $3^{rd}$ generation (3G) and long term evolution (LTE) is under consideration to provide faster data rates.

For implementation of 5G communication, a stand-alone (SA) scheme and a non-stand alone (NSA) scheme are considered. The NSA scheme enables use of a new radio (NR) system together with the legacy LTE system. In the NSA scheme, a user equipment (UE) may communicate with a next-generation Node B (gNB) of the NR system as well as an evolved Node B (eNB) of the LTE system. A technology that enables a UE to use heterogeneous communication systems may be referred to as dual connectivity.

Dual connectivity was first proposed under $3^{rd}$ generation partnership project (3GPP) Release-12. The first proposed dual connectivity was for using a 3.5 GHz frequency band as a small cell in addition to the LTE system. In the 5G NSA scheme, implementation of the dual connectivity suggested by 3GPP Release-12 by using the LTE system as a master node and the NR system as a secondary node is under consideration.

SUMMARY

As described above, an electronic device supporting dual connectivity may perform communication through heterogeneous communication networks. For example, the electronic device may use both of first and second networks by setting up a split bearer. In this case, the electronic device may configure either the first network or the second network as an uplink primary path. The electronic device may receive information indicating the primary path and information about an uplink split threshold. The electronic device may transmit transmission data to a base station (BS) through the primary path. If the size of the transmission data is greater than or equal to the uplink split threshold, the electronic device may also transmit the transmission data through the secondary path other than the primary path.

Upon detection of a failure in the network of the primary path, when the size of the transmission data is less than the uplink split threshold, the UE is configured not to transmit the transmission data in the secondary path. As a result, an uplink data stall occurs. In an electronic device and a method of operating the same according to various embodiments of the disclosure, upon detection of a failure in a network of a primary path in a state in which a split bearer has been established, a bearer for data transmission is switched to a bearer established in a secondary path and transmission data is transmitted via the bearer of the secondary path.

There has been no specified technique for enabling a user device to actively switch from a network of a primary path to another network, even upon detection of a failure in the network of the primary path. In an electronic device and a method of operating the same according to various embodiments of the disclosure, upon detection of a failure in a network of a primary path, a measurement value of the network is set to a predetermined value and reported to an external electronic device.

Additional aspects will be set forth in part in the description which follows and, in part, will be apparent from the description, or may be learned by practice of the presented embodiments of the disclosure.

According to an embodiment of the disclosure, an electronic device includes a first communication processor supporting first network communication with a first network, and a second communication processor supporting second network communication with a second network different from the first network. When both of the first network communication and the second network communication are set to a data transmittable state, the second communication processor is configured to transmit transmission data based on the second network communication selected as a primary path from between the first network communication and the second network communication, when the size of the transmission data is less than a predetermined threshold. In response to detection of a failure in the second network communication, the first communication processor is configured to transmit the transmission data based on the first network communication, irrespective of whether the size of the transmission data is equal to or larger than the predetermined threshold.

According to another embodiment of the disclosure, a method of operating an electronic device including a first communication processor supporting first network communication with a first network and a second communication processor supporting second network communication with a second network different from the first network includes, when both of the first network communication and the second network communication are set to a data transmittable state, transmitting transmission data based on the second network communication selected as a primary path from between the first network communication and the second network communication by the second communication processor, when the size of the transmission data is less than a predetermined threshold, and transmitting the transmission data based on the first network communication in response to detection of a failure in the second network communication by the first communication processor, irrespective of whether the size of the transmission data is equal to or larger than the predetermined threshold.

According to another embodiment of the disclosure, an electronic device includes a first communication processor supporting first network communication with a first network, and a second communication processor supporting second network communication with a second network different from the first network. When both of the first network communication and the second network communication are set to a data transmittable state, the second communication processor is configured to transmit transmission data based on the second network communication selected as a primary path from between the first network communication and the second network communication, when the size of the transmission data is less than a predetermined threshold. In response to detection of a failure in the second network communication, the first communication processor is configured to transmit, to a first node corresponding to the first network communication, a report signal with at least one parameter indicating the strength of a signal of the second network communication, measured by the electronic device to a lowest value.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9C illustrates a diagram of data conversion between network layers;

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
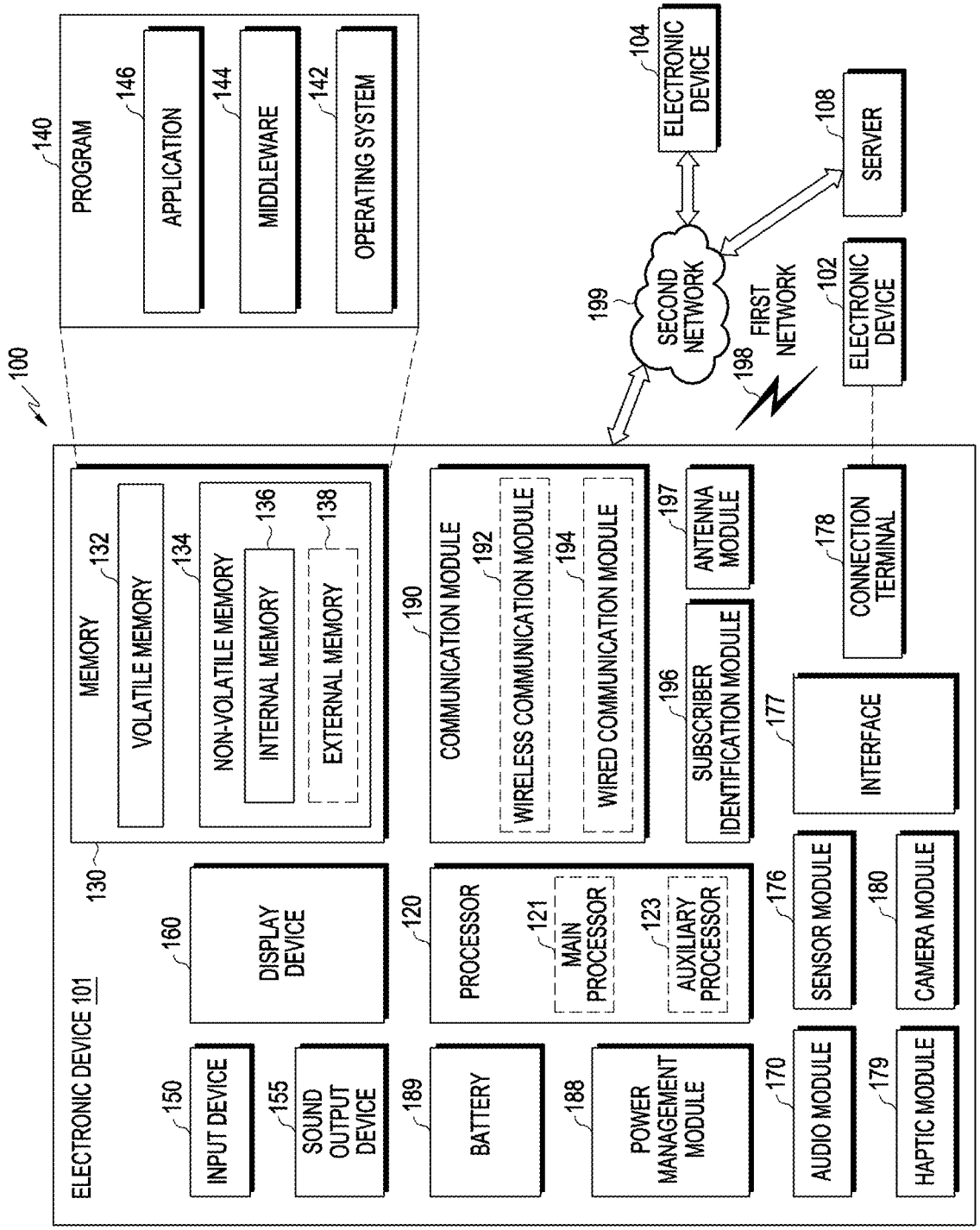
FIG. 1 illustrates a block diagram of an electronic device in a network environment according to various embodiments of the disclosure.

FIG. 1 illustrates a block diagram of an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
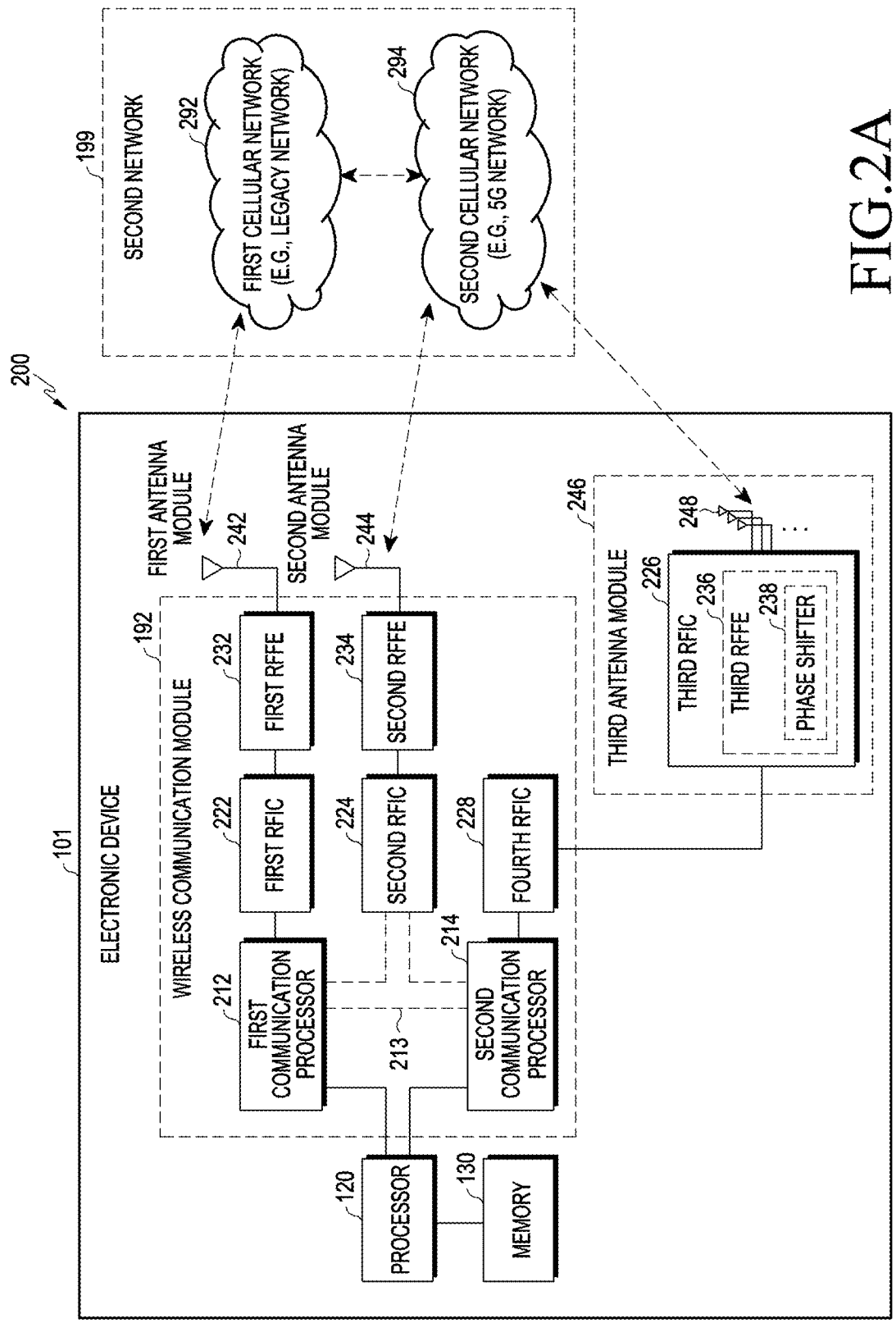
FIG. 2A illustrates a block diagram of an electronic device supporting legacy network communication and $5^{th}$ generation (5G) network communication according to various embodiments of the disclosure.

FIG. 2A illustrates a block diagram 200 of the electronic device 101 supporting legacy network communication and 5$^{th}$ generation (5G) network communication according to various embodiments of the disclosure. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The network 199 may include a first network 292 and a second network 294. According to another embodiment of the disclosure, the electronic device 101 may further include at least one of the components illustrated in FIG. 1, and the network 199 may further include at least one other network. According to an embodiment of the disclosure, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment of the disclosure, the fourth RFIC 228 may be omitted or included as part of the third RFIC 226.

The first communication processor 212 may establish a communication channel in a band to be used for wireless communication with the first network 292 and support legacy network communication through the established communication channel. According to various embodiments of the disclosure, the first network 292 may be a legacy network including a $2^{nd}$ generation (2G), $3^{rd}$ generation (3G), $4^{th}$ generation (4G), or LTE network. The second communication processor 214 may establish a communication channel corresponding to a predetermined band (e.g., about 6 GHz to about 60 GHz) out of a band to be used for wireless communication with the second network 294 and support 5G network communication through the established communication channel. According to various embodiments of the disclosure, the second network 294 may be a 5G network defined by the 3GPP. Additionally, according to an embodiment of the disclosure, the first communication processor 212 or the second communication processor 214 may establish a communication channel corresponding to another predetermined band (e.g., about 6 GHz or less) out of the band to be used for wireless communication with the second network 294 and support 5G network communication through the established communication channel.

The first communication processor 212 may transmit and receive data to and from the second communication processor 214. For example, data supposed to be transmitted through the second cellular network 294 may be scheduled to be transmitted through the first cellular network 292. In this case, the first communication processor 212 may receive the transmission data from the second communication processor 214.

For example, the first communication processor 212 may transmit and receive data to and from the second communication processor 214 via an inter-processor interface 213. The inter-processor interface 213 may be configured as, but not limited to, a universal asynchronous receiver/transmitter (UART) (e.g., high speed-UART (HS-UART)) interface or a peripheral component interconnect bus express (PCIe) interface. Alternatively, the first communication processor 212 and the second communication processor 214 may exchange control information and packet data information by means of, for example, a shared memory. The first communication processor 212 may transmit and receive various pieces of information such as sensing information, information about an output strength, and resource block (RB) allocation information to and from the second communication processor 214.

Depending on their implementation, the first communication processor 212 may not be coupled directly to the second communication processor 214. In this case, the first communication processor 212 may transmit and receive data to and from the second communication processor 214 through the processor 120 (e.g., application processor). For example, although the first communication processor 212 may transmit and receive data to and from the second communication processor 214 through an HS-UART interface or a PCIe interface, the type of an interface is not limited. Alternatively, the first communication processor 212 may exchange control information and packet data information with the second communication processor 214 by the processor 120 (e.g., application processor) and a shared memory.

Figure 2B:
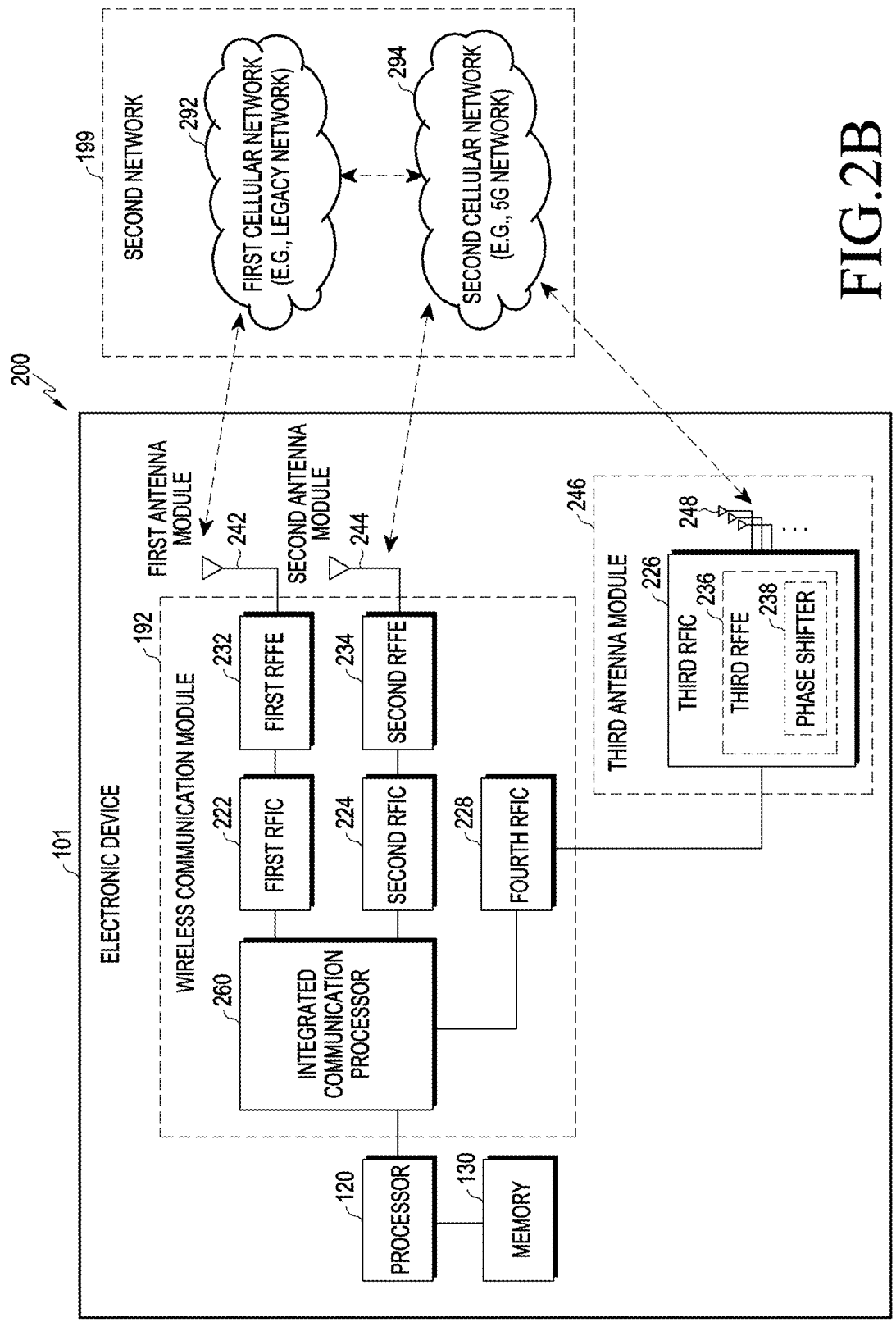
FIG. 2B illustrates a block diagram of an electronic device supporting legacy network communication and 5G network communication according to various embodiments of the disclosure.

According to an embodiment of the disclosure, the first communication processor 212 and the second communication processor 214 may be incorporated in a single chip or a single package. According to various embodiments of the disclosure, the first communication processor 212 or the second communication processor 214 may be incorporated together with the processor 120, the auxiliary processor 123, or the communication module 190 in a single chip or a single package. For example, as illustrated in FIG. 2B, an integrated communication processor 260 may support all of functions for communication with the first cellular network and the second cellular network.

For transmission, the first RFIC 222 may convert a baseband signal generated by the first communication processor 212 to an RF signal in about 700 MHz to about 3 GHz used in the first network 292 (e.g., the legacy network). For reception, an RF signal is obtained from the first network 292 (e.g., the legacy network) through an antenna (e.g., the first antenna module 242) and pre-processed in an RFFE (e.g., the first RFFE 232). The first RFIC 222 may convert the pre-processed RF signal to a baseband signal so that the baseband signal may be processed in the first communication processor 212.

For transmission, the second RFIC 224 may convert a baseband signal generated by the first communication processor 212 or the second communication processor 214 to an RF signal in a Sub6 band (e.g., about 6 GHz or less) used in the second network 294 (e.g., the 5G network). For reception, a 5G Sub6 RF signal is obtained from the second network 294 (e.g., the 5G network) through an antenna (e.g., the second antenna module 244) and pre-processed in an RFFE (e.g., the second RFFE 234). The second RFIC 224 may convert the pre-processed 5G Sub6 RF signal to a baseband signal so that the baseband signal may be processed in a corresponding one between the first communication processor 212 and the second communication processor 214.

For transmission, the third RFIC 226 may convert a baseband signal generated by the second communication processor 214 to an RF signal in a 5G Above6 band (e.g., about 6 GHz to about 60 GHz) to be used in the second network 294 (e.g., the 5G network). For reception, a 5G Above6 RF signal is obtained from the second network 294 (e.g., the 5G network) through an antenna (e.g., the antenna 248) and pre-processed in the third RFFE 236. The third RFIC 226 may convert the pre-processed 5G Above6 RF signal to a baseband signal so that the baseband signal may be processed in the second communication processor 214. According to an embodiment of the disclosure, the third RFFE 236 may be formed as part of the third RFIC 226.

According to an embodiment of the disclosure, the electronic device 101 may include the fourth RFIC 228 separately from or as part of the third RFIC 226. In this case, the fourth RFIC 228 may convert a baseband signal generated by the second communication processor 214 to an RF signal in an intermediate frequency band (e.g., about 9 GHz to about 11 GHz) (hereinafter, referred to as an intermediate frequency (IF) signal), and provide the IF signal to the third RFIC 226. The third RFIC 226 may convert the IF signal to a 5G Above6 RF signal. During reception, a 5G Above6 RF signal may be received from the second network 294 (e.g., the 5G network) through an antenna (e.g., the antenna 248) and converted to an IF signal by the third RFIC 226. The fourth RFIC 228 may convert the IF signal to a baseband signal so that the baseband signal may be processed in the second communication processor 214.

According to an embodiment of the disclosure, the first RFIC 222 and the second RFIC 224 may be implemented as at least part of a single chip or a single package. According to an embodiment of the disclosure, the first RFFE 232 and the second RFFE 234 may be implemented as at least part of a single chip or a single package. According to an embodiment of the disclosure, at least one of the first antenna module 242 or the second antenna module 244 may be omitted or combined with the other antenna module to process RF signals in a plurality of corresponding bands.

According to an embodiment of the disclosure, the third RFIC 226 and the antenna 248 may be arranged on the same substrate to form a third antenna module 246. For example, the wireless communication module 192 or the processor 120 may be arranged on a first substrate (e.g., a main printed circuit board (PCB)). In this case, the third RFIC 226 may be arranged in a partial area (e.g., the bottom surface) of a second substrate other than the first substrate and the antenna 248 may be arranged in another partial area (e.g., the top surface) of the second substrate, to form the third antenna module 246. As the third RFIC 226 and the antenna 248 are arranged on the same substrate, it is possible to reduce the length of a transmission line between the third RFIC 226 and the antenna 248. This may reduce, for example, loss (e.g., attenuation) of a signal in a high frequency band (e.g., about 6 GHz to about 60 GHz) used for 5G communication, on the transmission line. Therefore, the electronic device 101 may increase the quality or speed of communication with the second network 294 (e.g., the 5G network).

According to an embodiment of the disclosure, the antenna 248 may be formed as an antenna array including a plurality of antenna elements which may be used for beamforming. In this case, for example, the third RFIC 226 may include a plurality of phase shifters 238 corresponding to the plurality of antenna elements, as part of the third RFFE 236. During transmission, each of the phase shifters 238 may change the phase of a 5G Above6 RF signal to be transmitted to the outside of the electronic device 101 (e.g., a base station (BS) in the 5G network) through an antenna element corresponding to the phase shifter 238. During reception, each of the phase shifters 238 may change the phase of a 5G Above6 RF signal received from the outside through an antenna element corresponding to the phase shifter to the same or substantially same phase. This enables transmission or reception through beamforming between the electronic device 101 and the outside.

The second network 294 (e.g., the 5G network) may be operated independently of the first network 292 (e.g., the legacy network) (e.g., SA) or in connection to the first network 292 (e.g., the legacy network) (e.g., NSA). For example, the 5G network may include only an access network (e.g., a 5G radio access network (RAN) or next generation RAN (NG RAN) without a core network (e.g., a next generation core (NGC)). In this case, after accessing the access network of the 5G network, the electronic device 101 may access an external network (e.g., the Internet) under the control of the core network (e.g., evolved packet core (EPC)) of the legacy network. Protocol information for communication with the legacy network (e.g., LTE protocol information) and protocol information for communication with the 5G network (e.g., NR protocol information) may be stored in the memory 130 and accessed by another part (e.g., the processor 120, the first communication processor 212, or the second communication processor 214).

Figure 3A:
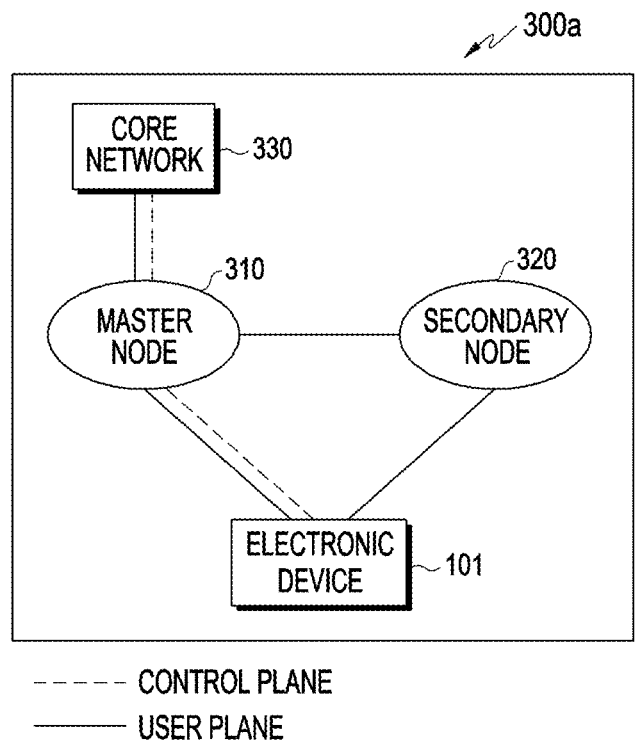
FIG. 3A illustrates a diagram of a wireless communication system which provides a legacy communication network and/or a 5G communication network according to various embodiments of the disclosure.
Figure 3B:
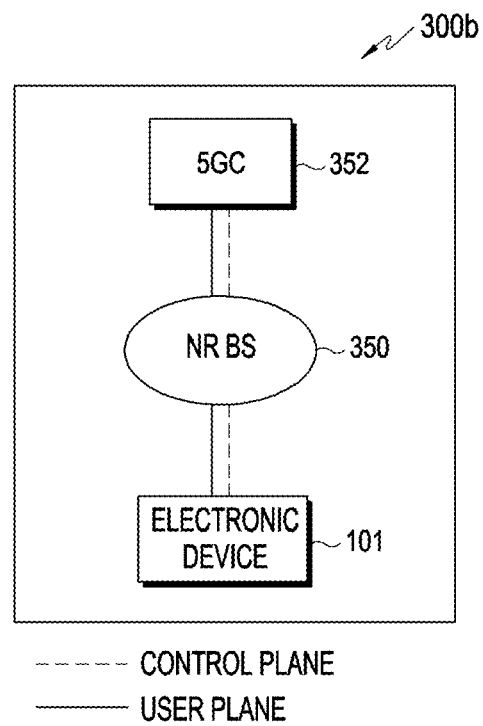
FIG. 3B illustrates a diagram of a wireless communication system which provides a legacy communication network and/or a 5G communication network according to various embodiments of the disclosure.
Figure 3C:
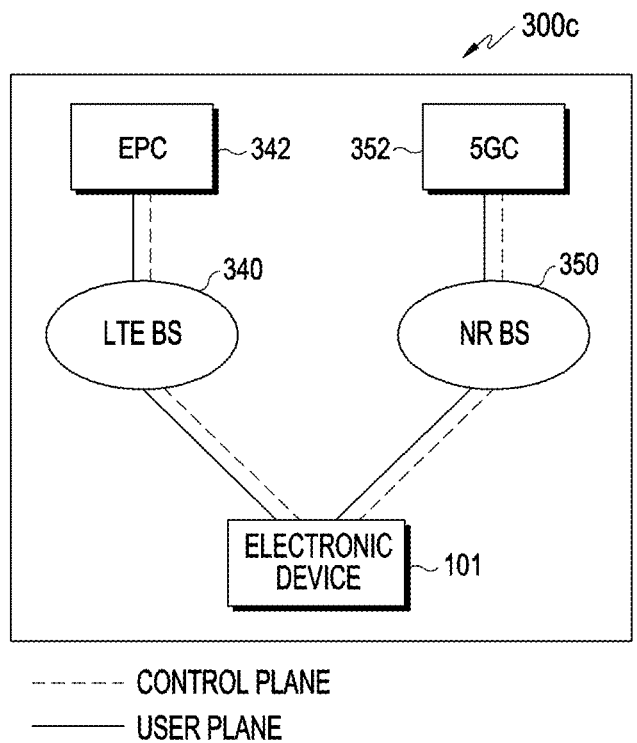
FIG. 3C illustrates a diagram of a wireless communication system which provides a legacy communication network and/or a 5G communication network according to various embodiments of the disclosure.

FIGS. 3A, 3B and 3C illustrate diagrams of wireless communication systems which provide a legacy communication network and/or a 5G communication network. Referring to FIGS. 3A, 3B and 3C, each of network environments 300*a*, 300*b* and 300*c* may include at least one of a legacy network or a 5G network. The legacy network may include, for example, a 4G or LTE BS 340 (e.g., an evolved Node B (eNB or eNodeB)) of the 3GPP standard supporting wireless access of the electronic device 101, and an EPC 342 which manages 4G communication. The 5G network may include, for example, an NR BS 350 (e.g., gNB or gNodeB) supporting wireless access of the electronic device 101, and a 5GC 352 which manages 5G communication of the electronic device 101.

According to various embodiments of the disclosure, the electronic device 101 may transmit and receive a control message and user data by legacy communication and/or 5G communication. The control message may include a message related to at least one of, for example, security control, bearer setup, authentication, registration, or mobility management of the electronic device 101. The user data may refer to, for example, user data except for a control message transmitted and received between the electronic device 101 and a core network 330 (e.g., the EPC 342).

Referring to FIG. 3A, the electronic device 101 according to an embodiment of the disclosure may transmit and receive at least one of a control message or user data to and from at least part (e.g., the NR BS 350 and the 5GC 352) of the 5G network by using at least part (e.g., the LTE BS 340 and the EPC 342) of the legacy network.

According to various embodiments of the disclosure, the network environment 300*a* may include a network environment which provides wireless communication dual connectivity (DC) to the LTE BS 340 and the NR BS 350 and transmits and receives a control message to and from the electronic device 101 through one core network 330 between the EPC 342 and the 5GC 352.

According to various embodiments of the disclosure, in a DC environment, one of the LTE BS 340 and the NR BS 350 may operate as a master node (MN) 310 and the other may operate as a secondary node (SN) 320. The MN 310 may be connected to the core network 330 and transmit and receive a control message to and from the core network 330. The MN 310 and the SN 320 may be connected to each other via a network interface and transmit and receive a message related to management of wireless resources (e.g., a communication channel) to and from each other.

According to various embodiments of the disclosure, the MN 310 may include the LTE BS 340, the SN 320 may include the NR BS 350, and the core network 330 may include the EPC 342. For example, a control message may be transmitted and received through the LTE BS 340 and the EPC 342, and user data may be transmitted through at least one of the LTE BS 340 or the NR BS 350.

According to various embodiments of the disclosure, the MN 310 may include the NR BS 350, the SN 320 may include the LTE BS 340, and the core network 330 may include the 5GC 352. For example, a control message may be transmitted and received through the NR BS 350 and the 5GC 352, and user data may be transmitted through at least one of the LTE BS 340 or the NR BS 350.

Referring to FIG. 3B, according to various embodiments of the disclosure, the 5G network may include the NR BS 350 and the 5GC 352, and independently transmit and receive a control message and user data to and from the electronic device 101.

Referring to FIG. 3C, according to various embodiments of the disclosure, each of the legacy network and the 5G network may provide data transmission and reception independently. For example, the electronic device 101 and the EPC 342 may transmit and receive a control message and user data to and from each other through the LTE BS 340. In another example, the electronic device 101 and the 5GC 352 may transmit and receive a control message and user data to and from each other through the NR BS 350.

According to various embodiments of the disclosure, the electronic device 101 may register to at least one of the EPC 342 or the 5GC 352 and transmit and receive a control message to and from the at least one of the EPC 342 or the 5GC 352.

According to various embodiments of the disclosure, the EPC 342 and the 5GC 352 may interwork to manage communication of the electronic device 101. For example, mobility information about the electronic device 101 may be transmitted and received via an interface between the EPC 342 and the 5GC 352.

As described before, dual connectivity through the LTE BS 340 and the NR BS 350 may be referred to as E-UTRA new radio dual connectivity (EN-DC).

Figure 4:
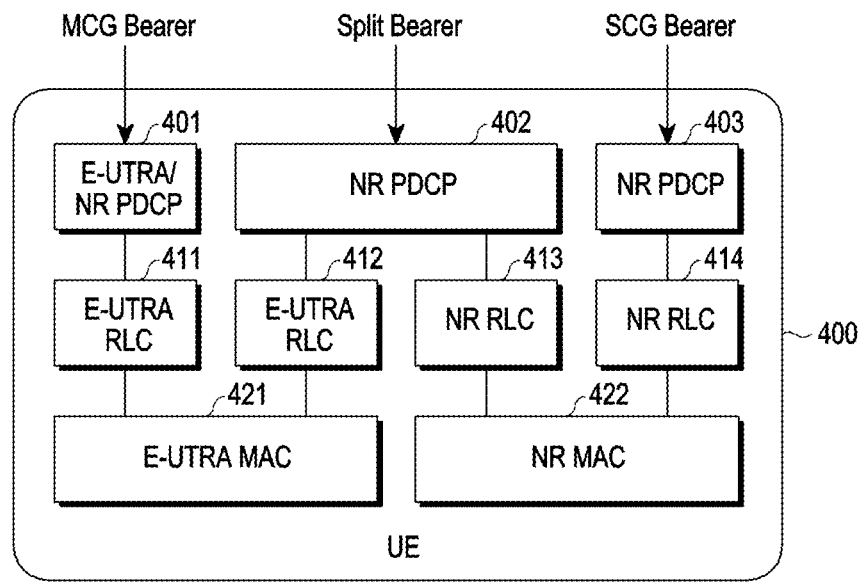
FIG. 4 illustrates a diagram of bearers at a user equipment (UE) according to various embodiments of the disclosure.

FIG. 4 illustrates a diagram of bearers at a UE according to various embodiments of the disclosure.

Bearers available in a 5G NSA network environment (e.g., the network environment 300a in FIG. 3A) may include a master cell group (MCG) bearer, a secondary cell group (SCG) bearer, and a split bearer. A UE 400 may be configured with an E-UTRA/NR packet data convergence protocol (PDCP) entity 401 and NR PDCP entities 402 and 403. The UE 400 may be configured with E-UTRA radio link control (RLC) entities 411 and 412 and NR RLC entities 413 and 414. The UE 400 may be configured with an E-UTRA MAC entity 421 and an NR MAC entity 422. The UE may refer to a user device capable of communicating with a BS and may be interchangeably used with the electronic device 101 of FIG. 1. For example, according to various embodiments of the disclosure, when it is said that the UE performs a specific operation, this may imply that at least one component of the electronic device 101 performs the specific operation.

An MCG may correspond to, for example, the MN illustrated in FIGS. 3A, 3B and 3C, and an SCG may correspond to, for example, the SN illustrated in FIGS. 3A, 3B and 3C. Once a node to communicate with is determined, the UE 400 may configure various entities illustrated in FIG. 4 to communicate with the determined node (e.g., a BS). The PDCP entities 401, 402 and 403 may receive data (e.g., a PDCP service data unit (SDU) corresponding to an IP packet) and output converted data (e.g., a PDCH PDU) in which additional information (e.g., header information) is reflected. The RLC entities 411, 412, 413, and 414 may receive the converted data (e.g., the PDCP PDU) from the PDCP entities 401, 402 and 403 and output converted data (e.g., an RLC PDU) in which additional information (e.g., header information) is reflected. The MAC entities 421 and 422 may receive the converted data (e.g., the RLC PDU) from the RLC entities 411, 412, 413, and 414 and output converted data (e.g., a MAC PDU) in which additional information (e.g., header information) is reflected to a physical (PHY) layer (not shown). Various embodiments of information conversion between entities will be described in greater detail with reference to FIGS. 9A to 9D.

In dual connectivity, the MCG bearer may be associated with a path (or data) in which data may be transmitted and received only by using resources or an entity corresponding to the MN. In dual connectivity, the SCG bearer may be associated with a path (or data) in which data may be transmitted and received only by using resources or an entity corresponding to the SN. In dual connectivity, the split bearer may be associated with a path (or data) in which data may be transmitted and received by using resources or an entity corresponding to the MN or resources or an entity corresponding to the SN. Accordingly, the split bearer may be associated with all of the E-UTRA RLC entity 412, the NR RLC entity 413, the E-UTRA MAC entity 421, and the NR MAC entity 422 through the NR PDCP entity 402.

Figure 5A:
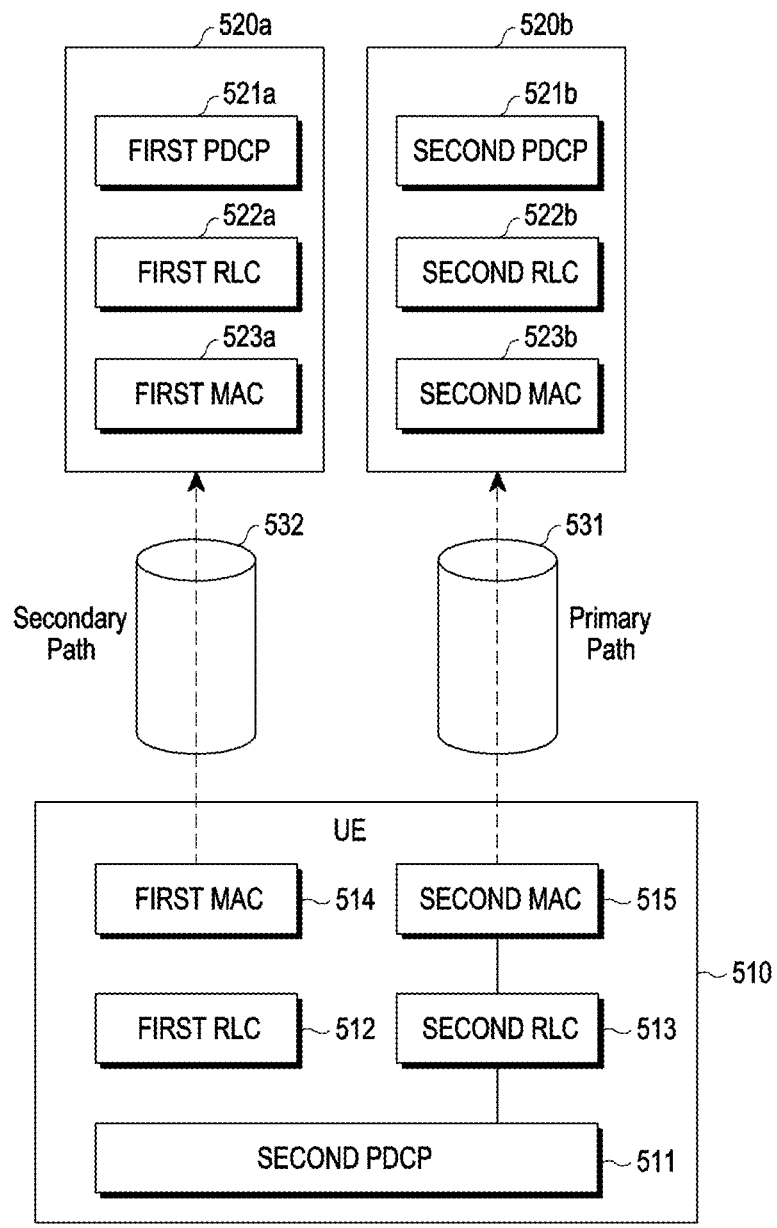
FIG. 5A illustrates a diagram of uplink paths between a UE and base stations (BSs) according to various embodiments of the disclosure.

FIG. 5A illustrates a diagram of uplink paths between a UE and BSs according to various embodiments of the disclosure.

Referring to FIG. 5A, according to various embodiments of the disclosure, a UE 510 (e.g., the electronic device 101) may communicate with BSs 520a and 520b based on a split bearer. Therefore, transmission data (e.g., an IP packet) to be transmitted to the BS 520a or 520b by the UE 510 may be provided to a second RLC entity 513 and a second MAC entity 515 or to a first RLC entity 512 and a first MAC entity 514, through a second PDCP entity 511. For example, the first RLC entity 512 and the first MAC entity 514 may be associated with a first network, and the second RLC entity 513 and the second MAC entity 515 may be associated with a second network. The first BS 520a may configure a first PDCP entity 521a, a first RLC entity 522a, and a first MAC entity 523a. The second BS 520b may configure a second PDCP entity 521b, a second RLC entity 522b, and a second MAC entity 523b. A path associated with the second RLC entity 513 and the second MAC entity 515 may be a primary path 531, whereas a path associated with the first RLC entity 512 and the first MAC entity 514 may be a secondary path 532. The first PDCP entity 521a and the second PDCP entity 521b may be configured identically. For EN-DC implementation, for example, when the BS 520a is an LTE BS, the first PDCP entity 521a may be configured as an NR PDCP entity. According to various embodiments of the disclosure, a specific PDCP entity (e.g., an NR PDCP entity) may reside in the BS 520a or the BS 520b. When a split bearer is configured, at least one of the first PDCP entity 521a or the second PDCP entity 521b may transmit data to a core network. In various embodiments of the disclosure, either the first PDCP entity 521a or the second PDCP entity 521b may not be present. The BS 520a and the BS 520b may communicate directly with each other.

As far as they are capable of dual connectivity, any networks may serve as the first and second networks. For example, the first and second networks may correspond to LTE communication and NR communication, respectively. For example, both of the first and second networks may relate to LTE communication, with the second network corresponding to a small cell of a specific frequency. For example, both of the first and second networks may relate to 5G communication, with the first network in a frequency band below 6 GHz (e.g., below 6) and the second network in a frequency band above 6 GHz (e.g., over 6).

According to various embodiments of the disclosure, the UE 510 may transmit transmission data based on a split bearer through at least one of the BS 520a, the BS 520b, the first network, or the second network. According to various embodiments of the disclosure, the UE 510 may configure the second network associated with the second BS 520b corresponding to an SCG as a primary path 531, and the first network associated with the first BS 520a corresponding to an MCG as a secondary path 532. For example, the UE 510 may configure the second network associated with the SCG as the primary path 531 based on information about the primary path, received from an MN. The information about the primary path, received from the MN may be received in an RRC signal (e.g., RRCReconfiguration). In another embodiment of the disclosure, there is no limit on how the UE 510 configures a primary path. For example, the primary path may be determined based on the policy of each communication business operator, and the UE 510 may receive information about a primary path and identify the primary path. The information about the primary path may include the cell group ID and LCD of a primary RLC entity for uplink data transmission, when the PDCP entity is associated with more than one RLC entity. The second PDCP entity 521b may be included in the BS 520a having the primary path. According to various embodiments of the disclosure, the first PDCP entity 521a may be included in the BS 520b having the secondary path.

According to various embodiments of the disclosure, UE 510 may identify information about an uplink split threshold. The UE 510 may receive the information about the uplink split threshold from the MN and identify the information. The information about the uplink split threshold may be included in a UE-specific or UE-dedicated RRC signal (e.g., RRCReconfiguration). According to various embodiments of the disclosure, the UE 510 is not limited to any particular method of identifying information about an uplink split threshold.

Table 1 below describes the format of an RRCReconfiguration message According to various embodiments of the disclosure.

As underlined in the above table, ul-datasplitthreshold may be defined as an uplink split threshold in the RRCReconfiguration message.

The information about the uplink split threshold may also be determined based on, for example, the policy of each communication business operator. The UE 510 may identify that a transmitting PDCP entity (e.g., the second PDCP entity 511) is associated with two or more RLC entities (e.g., the first RLC entity 512 and the second RLC entity 513), and the two or more RLC entities (e.g., the first RLC entity 512 and the second RLC entity 513) belong to different cell groups. In this case, the UE may identify whether the total amount of PDCP data and RLC data is equal to or larger than the uplink split threshold. When the total amount of PDCP data and RLC data is equal to or larger than the uplink split threshold, the transmitting PDCP entity (e.g., the second PDCP entity 511) of the UE 510 may submit a PDCP PDU to a primary RLC entity or a secondary RLC entity. When the total amount of PDCP data and RLC data is less than the uplink split threshold, the transmitting PDCP entity (e.g., the second PDCP entity 511) of the UE 510 may submit the PDCP PDU only to the primary RLC entity. As described above, when the size of transmission data is equal to or larger than the threshold, the UE 510 may transmit the data through the primary path 531 and the secondary path 532. When the size of transmission data is less than the threshold, the UE 510 may transmit the data only through the primary path 531.

According to various embodiments of the disclosure, the UE 510 may identify that a failure has occurred in the SCG of the primary path 531. For example, when the number of RLC retransmissions associated with the SCG is larger than a threshold, the UE 510 may identify that a failure (e.g., an SCG RLC failure) has occurred in the SCG. Alternatively, the UE 510 may identify the SCG failure based on reception of an indication indicating a failure in the SCG. Those skilled in the art will understand that the type of an event configured for failure identification in an SCG at a UE is not

TABLE 1

```
RRCReconfiguration-IEs ::=   SEQUENCE {
  radioBearerConfig            RadioBearerConfig       OPTIONAL, -- Need M
                               OPTIONAL, -- Need M
RadioBearerConfig ::=          SEQUENCE {
...
  drb-ToAddModList             DRB-ToAddModList        OPTIONAL, -- Need N
    ...
}
DRB-ToAddModList ::=           SEQUENCE (SIZE (1..maxDRB)) OF DRB-ToAddMod
DRB-ToAddMod ::=               SEQUENCE {
...
  pdcp-Config                  PDCP-Config             OPTIONAL,
-- Cond PDCP
    ...
}
PDCP-Config ::=                SEQUENCE {
  drb                          SEQUENCE {
...
  moreThanOneRLC               SEQUENCE {
    primaryPath                SEQUENCE {
      cellGroup                CellGroupId             PTIONAL,   -- Need R
      logicalChannel           LogicalChannelIdentity  OPTIONAL   -- Need R
    },
    ul-DataSplitThreshold      UL-DataSplitThreshold   OPTIONAL, -- Cond
SplitBearer
    pdcp-Duplication           ENUMERATED { true }     OPTIONAL   -- Need R
}
``` limited. In EN-DC, for example, when transmission (Tx) power is limited, the UE may generally allocate LTE power with priority. Even when an SCG electric field is relatively good, a failure may occur in the uplink SCG. Particularly, the reliability of an SCG side may be lower than the reliability of an MCG side and the reconfiguration failure issue may be highly likely to occur in the SCG.

When a failure occurs in the SCG being the primary path 531, data transmission from the UE 510 to BSs of the SCG may also fail. When the split bearer is continuously maintained despite setup of the split bearer, the UE 510 may not transmit data in the secondary path 532 associated with the MCG. As described before, in the case where the transmitting PDCP entity (e.g., the second PDCP entity 511) of the UE 510 is associated with two or more RLC entities (e.g., the first RLC entity 512 and the second RLC entity 513) included in different cell groups, only when the size of data in a buffer is equal to or larger than a threshold, the UE 510 may transmit the data in the secondary path 532 associated with the MCG. Accordingly, when the split bearer is maintained according to the size of data in the buffer, for example, when the PDCP entity (e.g., the second PDCP entity 511) is kept associated with two or more different RLC entities (e.g., the first RLC entity 5142 and the second RLC entity 513), data transmission may be discontinued. Alternatively, a threshold (e.g., an uplink split threshold) may be set to an infinite value. In this case, data transmission in the secondary path 532 associated with the SCG may be impossible as far as the split bearer is maintained.

Further, even when the UE 510 transmits an SCG failure report or SCG failure information to the BS 520b, the BS 520b may not provide a function of switching a bearer configuration to the MCG. In this case, even though the SCG failure report is transmitted, data transmission in the secondary path 532 associated with the SCG may not be guaranteed. For the above-described various reasons, a transmission data delay may occur and a TCP transmission may fail.

According to various embodiments of the disclosure, the UE 510 may switch the uplink path from the path corresponding to the SCG, which is the primary path 531 to the path corresponding to the MCG, which is the secondary path 532. Therefore, the UE 510 may transmit data to the BS 520a via the path corresponding to the MCG. For example, at least one communication processor (e.g., at least one of the first communication processor 212 or the second communication processor 214, or the integrated communication processor 260) of the electronic device 101 may associate the transmitting PDCP entity with one RLC entity (e.g., an E-UTRA RLC entity) to transmit data to the BS 520a in the path associated with the SCG.

Figure 5B:
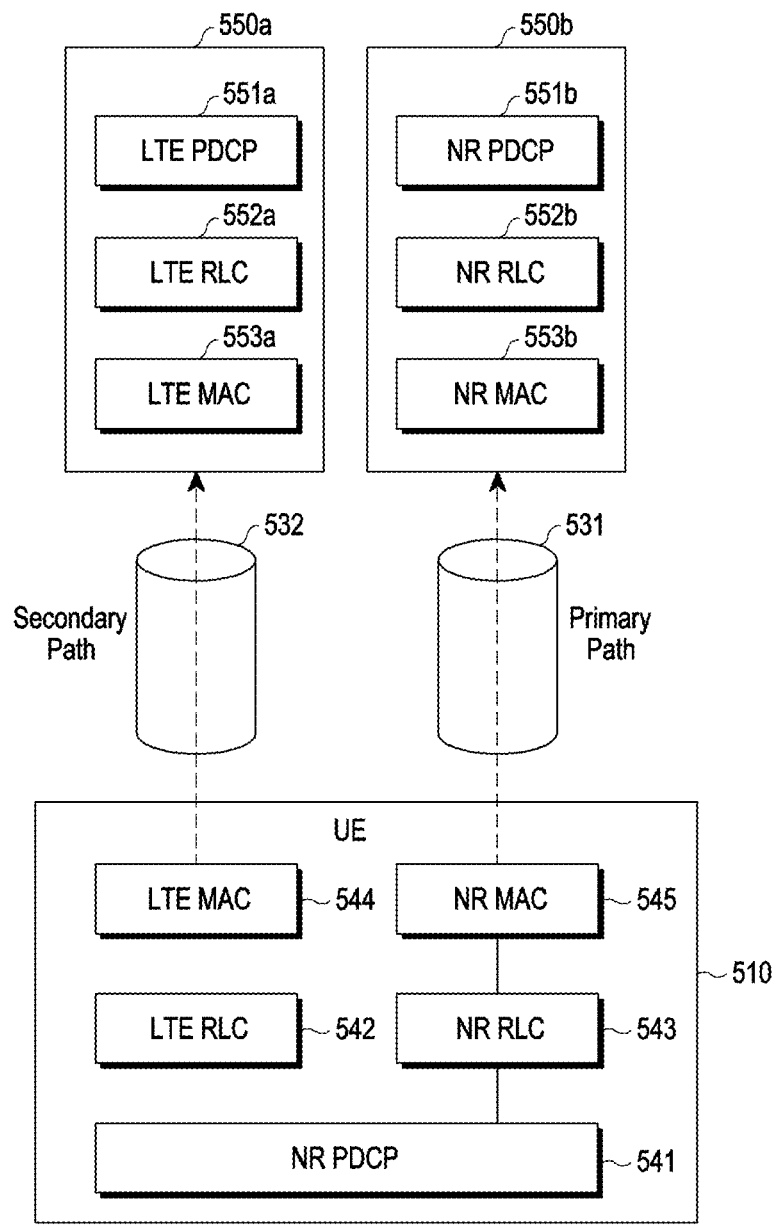
FIG. 5B illustrates a diagram of paths between a UE and BSs, when a split bearer has been established in E-UTRA new radio dual connectivity (EN-DC) according to various embodiments of the disclosure.

FIG. 5B illustrates a diagram of paths between a UE and BSs, when a split bearer is configured for EN-DC, according to various embodiments of the disclosure.

According to various embodiments of the disclosure, the UE 510 may configure a split bearer for EN-DC. Therefore, an NR PDCP entity 541 may be associated with an LTE RLC entity 542 and an NR RLC entity 543. The LTE RLC entity 542 may be associated with an LTE MAC entity 544, and the NR RLC entity 543 may be associated with an NR MAC entity 545. An NR MAC entity 553b of the BS 550b may correspond to the NR MAC entity 545, and an LTE MAC entity 553a of the BS 550a may correspond to the LTE MAC entity 544. An NR PDCP entity 551a of the BS 550a may be associated with an LTE RLC entity 552a, and an NR PDCP entity 551b of the BS 550b may be associated with an NR RLC entity 552b. The LTE RLC entity 522a may be associated with the LTE MAC entity 553a, and the NR RLC entity 552b may be associated with the NR MAC entity 553b. The NR network may be configured as the primary path 531, and the LTE network may be configured as the secondary path 532. In EN-DC, the standard has suggested that the LTE BS 550a is configured with the NR PDCP entity 551a. Particularly for the split bearer, the LTE BS 550a may need to be configured with the NR PDCP entity 551a. The NR PDCP entity may reside in the LTE BS 550a or the NR BS 550b. Regarding the split bearer, at least one of the NR PDCP entity 551a of the LTE BS 550a or the NR PDCP entity 551b of the NR BS 550b may transmit data to the core network. It may be effective to configure the NR PDCP entity 551b in the primary path 531. However, it is also possible to configure the NR PDCP entity 551a in the LTE BS 550a. For this reason, the NR PDCP entity 551a is marked with a dotted line. Further, the LTE BS 550a and the NR BS 550b may directly transmit and receive data to and from each other. As described before, various embodiments of the disclosure are applicable to various types of DC as well as EN-DC illustrated in FIG. 5B.

Figure 6A:
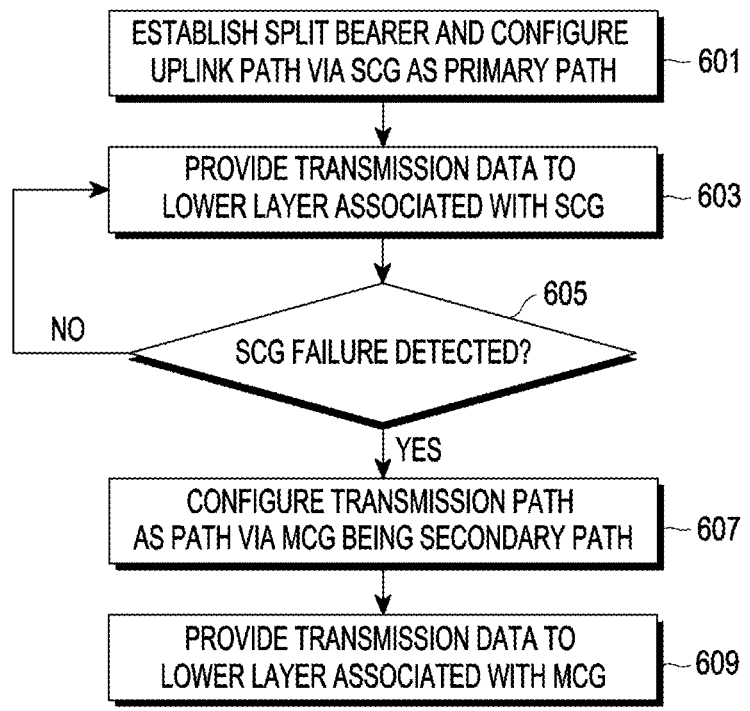
FIG. 6A illustrates a flowchart of a method of operating an electronic device according to various embodiments of the disclosure.

FIG. 6A illustrates a flowchart of a method of operating an electronic device according to various embodiments of the disclosure.

According to various embodiments of the disclosure, the electronic device 101 (e.g., at least one communication processor) may set up a split bearer and configure an uplink path via an SCG as a primary path in operation 601. For example, although the second communication processor 214 may set up the split bearer, the entity that sets up the split bearer is not limited. The operation of setting up a split bearer may amount to associating a transmitting PDCP entity with a plurality of RLC entities included in different cell groups.

According to various embodiments of the disclosure, the electronic device 101 may provide transmission data to a lower layer associated with the SCG in operation 603. The electronic device 101 may transmit the data through a path associated with the SCG, which has been configured as the primary path. For example, in EN-DC, the transmitting PDCP entity (e.g., the NR PDCP 541 of FIG. 5B) may provide the transmission data to an RLC entity associated with the SCG (e.g., the NR RLC entity 543 of FIG. 5B) and a MAC entity associated with the SCG (e.g., the NR MAC entity 545).

According to various embodiments of the disclosure, the electronic device 101 may identify whether an SCG failure has occurred in operation 605. For example, the electronic device 101 may identify whether an SCG failure has occurred based on detection of an event representing a predetermined SCG failure. When the SCG failure has not been detected in operation (No in operation 605), the electronic device 101 may transmit the data in the path associated with the SCG, which has been configured as the primary path.

According to various embodiments of the disclosure, when the SCG failure has been detected (Yes in operation 605), the electronic device 101 may transmit the data in a path (e.g., a path via an MCG) configured as a secondary path. For example, the electronic device 101 may transmit the data via an MCG radio bearer. For example, while the first communication processor 212 may configure data transmission through a bearer configured in the secondary path, the entity for performing the configuration is not limited. In EN-DC, for example, the electronic device 101 may associate the transmitting PDCP entity (e.g., the NR PDCP 541) with an RLC entity associated with the MCG (e.g., the LTE RLC entity 542). According to various embodiments of the disclosure, the electronic device 101 may provide the transmission data to a lower layer associated with the secondary path in operation 609. For example, the transmitting PDCP entity may provide the transmission data to an RLC entity associated with the MCG (e.g., the LTE RLC entity) and a MAC entity associated with the MCG (e.g., the LTE MAC entity). Even though the electronic device 101 configures the path associated with the SCG as the primary path, upon detection of an SCG failure, the electronic device 101 may transmit the transmission data in the path associated with the MCG, which has been configured as the secondary path. Accordingly, when the amount of data in a buffer is less than a threshold, the electronic device 101 may also transmit the transmission data in the path associated with the MCG, thereby preventing data stall.

According to various embodiments of the disclosure, the electronic device 101 may identify whether the path associated with the SCG has recovered. The electronic device 101 may check an indication related to SCG recovery in the PHY layer or MAC layer. In this case, the electronic device 101 may resume packet routing based on the SCG bearer or the split bearer.

Figure 6B:
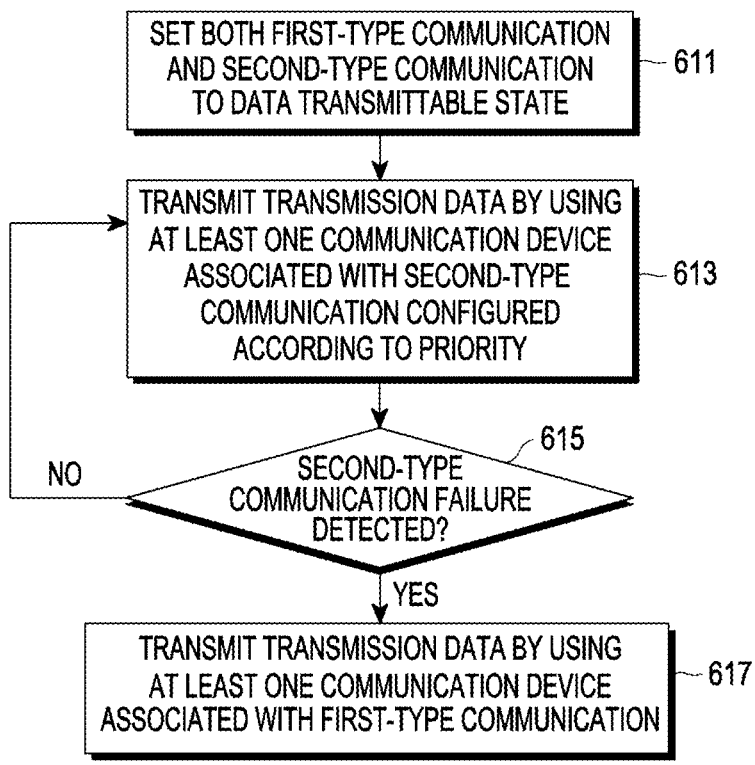
FIG. 6B illustrates a flowchart of a method of operating an electronic device according to various embodiments of the disclosure.

FIG. 6B illustrates a flowchart of a method of operating an electronic device according to various embodiments of the disclosure. The embodiment of FIG. 6B will be described in greater detail with reference to FIG. 2A.

According to various embodiments of the disclosure, the electronic device 101 (e.g., at least one communication processor) may configure both of first-type communication and second-type communication to be available for data transmission in operation 611. For example, the second communication processor 214 may configure both of the first-type communication and the second-type communication to a data transmittable state. This is exemplary and the entity for configuring communication to the data transmittable state is not limited. In an embodiment of the disclosure, the first-type communication may be LTE communication and the second-type communication may be NR communication, which could be understood as exemplary by those skilled in the art.

According to various embodiments of the disclosure, the electronic device 101 may transmit transmission data by using at least one communication device associated with the second-type communication configured according to its priority in operation 613. For example, the second communication processor 214 may select the second-type communication according to a priority identified based on externally received information. The electronic device 101 may transmit the transmission data by using at least one communication device associated with the second-type communication, for example, an RFIC associated with the second-type communication (e.g., the second RFIC 224 and the fourth RFIC 238), an RFFE associated with the second-type communication (e.g., the second RFFE 234 and the third RFFE 236), and an antenna module associated with the second-type communication (e.g., the second antenna module 244 and the third antenna module 246).

According to various embodiments of the disclosure, the electronic device 101 may identify whether a second-type communication failure has been detected in operation 615. When the second-type communication failure has not been detected (No in operation 615), the electronic device 101 may transmit the transmission data by using the at least one communication device associated with the second-type communication. When the second-type communication failure has been detected (Yes in operation 615), the electronic device 101 may transmit the transmission data by using at least one communication device associated with the first-type communication in operation 617 according to various embodiments of the disclosure. Even though the second-type communication has been configured as the primary path according to the priorities of the first-type communication and the second-type communication, the electronic device 101 may perform data transmission by the first-type communication which is the secondary path with a relatively low priority. Accordingly, the electronic device 101 may transmit the transmission data by using at least one communication device associated with the first-type communication (e.g., the first RFIC 222, the first RFEE 232, and the first antenna module 242).

Figure 7A:
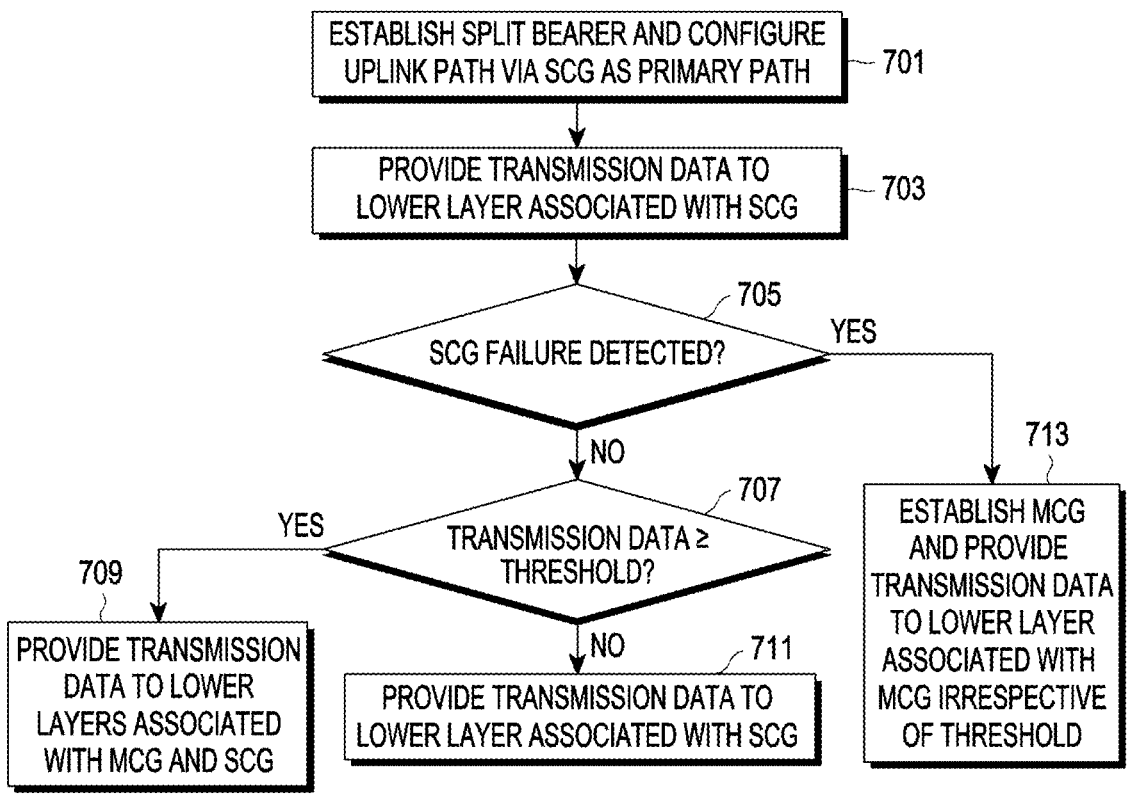
FIG. 7A illustrates a flowchart of a method of operating an electronic device according to various embodiments of the disclosure.

FIG. 7A illustrates a flowchart of a method of operating an electronic device according to various embodiments of the disclosure. Operations similar to those of FIG. 6A will be described in brief.

According to various embodiments of the disclosure, the electronic device 101 (e.g., at least one communication processor) may set up a split bearer and configure an uplink path via an SCG as a primary path in operation 701. For example, the electronic device 101 may set all of a plurality of types of communication to the data transmittable state. An uplink path via an MSG may be configured as a secondary path.

According to various embodiments of the disclosure, the electronic device 101 may provide transmission data to a lower layer associated with the SCG in operation 703. The electronic device 101 may transmit the transmission data in the uplink path via the SCG. For example, the electronic device 101 may transmit the transmission data based on a communication type with a higher priority.

According to various embodiments of the disclosure, the electronic device 101 may identify whether an SCG failure has been detected in operation 705. When the SCG failure has not been detected (No in operation 705), the electronic device may identify whether the size of the transmission data is equal to or larger than a threshold in operation 707 according to various embodiments of the disclosure. When the size of the transmission data is equal to or larger than the threshold (Yes in operation 707), the electronic device 101 may provide the transmission data to a lower layer associated with the MCG and a lower layer associated with the SCG in operation 709 according to various embodiments of the disclosure. For example, the transmitting PDCP entity of the electronic device 101 may provide the transmission data to both of an RLC entity associated with the MCG and an RLC entity associated with the SCG. The electronic device 101 may transmit the transmission data through the MCG and the SCG.

According to various embodiments of the disclosure, when the size of the transmission data is less than the threshold (No in operation 707), the electronic device 101 may provide the transmission data to the lower layer associated with the SCG in operation 711. Even though all of the plurality of communication types have been set to the data transmittable state, the electronic device 101 may transmit the transmission data by the communication type with the higher priority.

According to various embodiments of the disclosure, when an SCG failure has been detected (Yes in operation 705), the electronic device 101 may provide the transmission data to the lower layer associated with the MSG in operation 713. According to various embodiments of the disclosure, when an SCG failure has been detected, the electronic device 101 may be configured to transmit data in the MCG path irrespective of a threshold (e.g., an uplink split threshold).

Figure 7B:
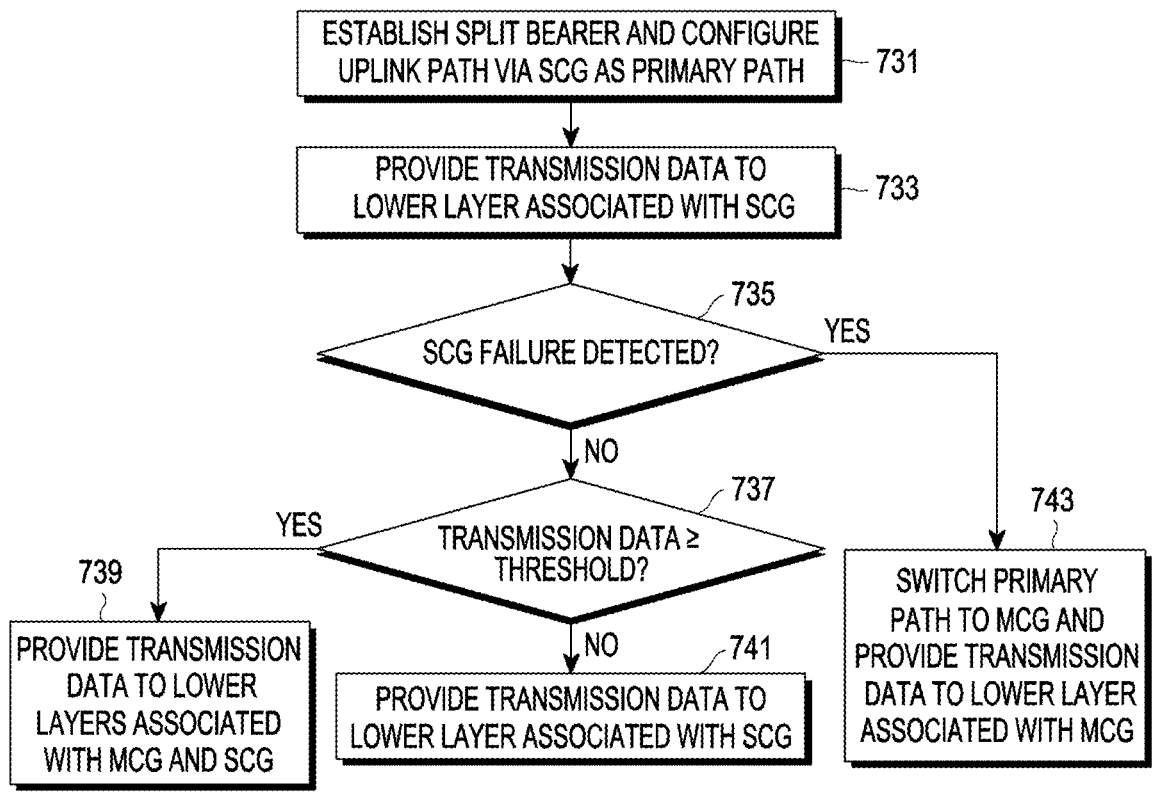
FIG. 7B illustrates a flowchart of a method of operating an electronic device according to various embodiments of the disclosure.

FIG. 7B illustrates a flowchart of a method of operating an electronic device according to various embodiments of the disclosure. Operations similar to those of FIG. 7A will be described in brief.

According to various embodiments of the disclosure, the electronic device 101 (at least one communication processor) may set up a split bearer and configure an uplink path via an SCG as a primary path in operation 731. According to various embodiments of the disclosure, the electronic device 101 may provide transmission data to a lower layer associated with the SCG in operation 733. According to various embodiments of the disclosure, the electronic device 101 may identify whether an SCG failure has been detected in operation 735. According to various embodiments of the disclosure, when an SCG failure has not been detected (No in operation 735), the electronic device 101 may identify whether the size of the transmission data is equal to or larger than a threshold in operation 737. According to various embodiments of the disclosure, when the size of the transmission data is equal to or larger than the threshold (Yes in operation 737), the electronic device 101 may provide the transmission data to a lower layer associated with an MCG and the lower layer associated with the SCG in operation 739. According to various embodiments of the disclosure, when the size of the transmission data is less than the threshold (No in operation 737), the electronic device 101 may provide the transmission data to the lower layer associated with the SCG in operation 741. According to various embodiments of the disclosure, when an SCG failure has been detected (Yes in operation 735), the electronic device 101 may switch the primary path to the MCG and provide the transmission data to the lower layer associated with the MCG in operation 743. According to various embodiments of the disclosure, the transmission data may further include data stored in the lower layer associated with the SCG. For example, the electronic device 101 may transmit the transmission data through a communication device associated with a communication scheme associated with the MCG by adjusting the priority of the communication scheme associated with the MCG.

Figure 8:
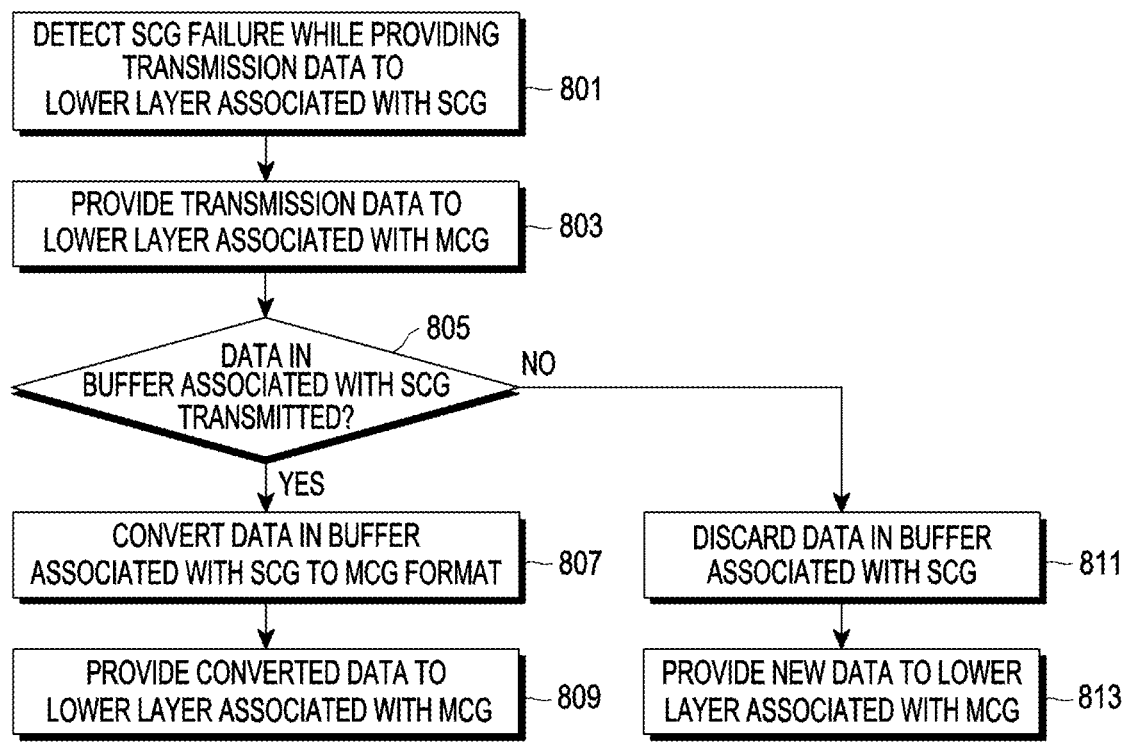
FIG. 8 illustrates a flowchart of a method of operating an electronic device according to various embodiments of the disclosure.

FIG. 8 illustrates a flowchart of a method of operating an electronic device according to various embodiments of the disclosure.

According to various embodiments of the disclosure, the electronic device 101 (e.g., at least one communication processor) may detect an SCG failure, while providing transmission data from a transmitting PDCP (e.g., the second PDCP 511 in FIG. 5A) to a lower layer associated with an SCG (e.g., the second RLC entity 513 in FIG. 5A) in operation 801. For example, the electronic device 101 may set up a split bearer and configure an uplink path via the SCG as a primary path. The electronic device 101 may transmit the transmission data through the uplink path of the SCG as the primary path and detect an SCG failure during the transmission.

According to various embodiments of the disclosure, the electronic device 101 may provide the transmission data to a lower layer associated with an MCG (e.g., the first RLC entity 512 in FIG. 5A). For example, the electronic device 101 may transmit the transmission data through an uplink path of the MCG configured as a secondary path.

According to various embodiments of the disclosure, the electronic device 101 may determine whether to transmit data buffered in a buffer associated with the SCG in operation 805. For example, although the buffer associated with the SCG may reside in the second communication processor 214, the buffer may be located outside the second communication processor 214. For example, the buffer may be incorporated as part of memory (e.g., the memory 130 in FIG. 1). The data in the buffer associated with the SCG may be data which has not been transmitted, for example, after the SCG failure and thus has been stored in the buffer.

According to various embodiments of the disclosure, when determining to transmit the data buffered in the buffer associated with the SCG (Yes in operation 805), the electronic device 101 may convert the data buffered in the buffer associated with the SCG to an MCG format in operation 807. For example, an RLC PDU (e.g., an NR RLC PDU) including at least one piece of header information associated with the SCG and the transmission data may be stored in the data in the buffer associated with the SCG. The electronic device 101 may extract the transmission data (or an RLC SDU) from the RLC PDU and generate an RLC PDU (e.g., an LTE RLC PDU) including at least one piece of header information associated with the MCG and the transmission data. According to various embodiments of the disclosure, the electronic device 101 may provide the converted data, for example, the LTE RLC PDU to the lower layer associated with the MCG in operation 809. According to various embodiments of the disclosure, operation 803 may be performed after operations 807 and 809. For example, when determining to transmit the data buffered in the buffer associated with the SCG (Yes in operation 805), the UE may convert the data buffered in the buffer associated with the SCG to an MCG format in operation 807, provide the converted data to the lower layer associated with the MCG in operation 809, and provide the transmission data to the lower layer associated with the MCG (e.g., the first RLC entity 512 in FIG. 5A) in operation 803.

According to various embodiments of the disclosure, when determining not to transmit the data buffered in the buffer associated with the SCG (No in operation 801), the electronic device 101 may discard the data in the buffer associated with the SCG in operation 811. According to various embodiments of the disclosure, the electronic device 101 may provide new data to the lower layer associated with the MCG in operation 813.

According to various embodiments of the disclosure, the electronic device 101 may determine whether to transmit the data buffered in the buffer associated with the SCG based on various types of parameters. For example, the electronic device 101 may convert an RLC PDU of the SCG to an RLC PDU of the MCG before a packet discard timer expires in the BS, in consideration of a PDCP reordering timer. Accordingly, when a time required to convert the data buffered in the buffer and then retransmit the converted data is less than the remaining time of the packet discard timer, the electronic device 101 may determine to transmit the data of the buffer. For example, the electronic device 101 may identify the time required for retransmission based on the size of the data in the buffer and determine whether to transmit the data of the buffer based on whether the identified time exceeds a threshold. Alternatively, the electronic device 101 may determine whether to transmit the data of the buffer based on whether the size of the data in the buffer exceeds a threshold.

Figure 9A:
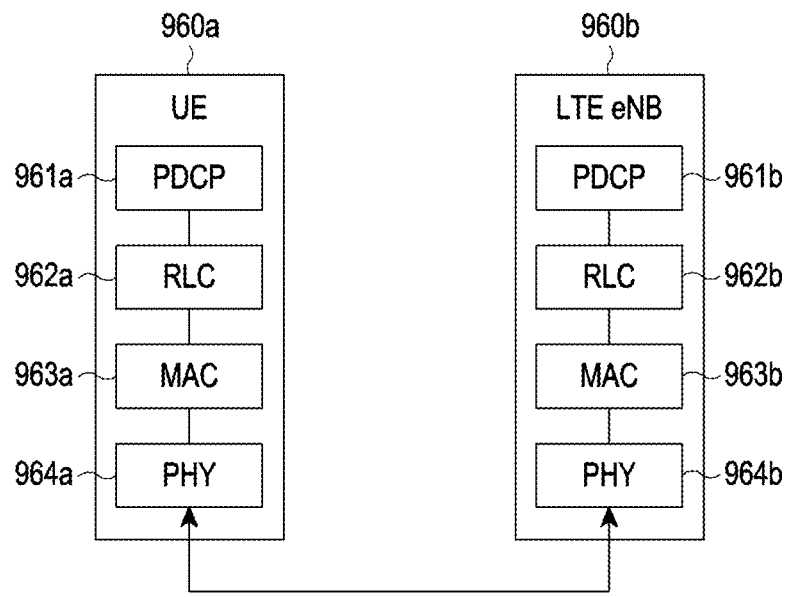
FIG. 9A illustrates a diagram of a radio protocol architecture in a long term evolution (LTE) system.

FIG. 9A illustrates a diagram of a radio protocol architecture in an LTE system.

Referring to FIG. 9A, radio protocols in the LTE system may include PDCPs 961a and 961b, RLCs 962a and 962b, and MACs 963a and 963b in a UE 960a and an LTE eNB 960b.

The PDCPs 961a and 961b may be responsible for IP header compression/decompression. The main functions of the PDCPs are summarized below.

Header compression and decompression: ROHC only
  Transfer of user data
  In-sequence delivery of upper layer PDUs at PDCP re-establishment procedure for RLC AM
  For split bearers in DC(only support for RLC AM): PDCP PDU routing for transmission and PDCP PDU reordering for reception
  Duplicate detection of lower layer SDUs at PDCP re-establishment procedure for RLC AM
  Retransmission of PDCP SDUs at handover and, for split bearers in DC, of PDCP PDUs at PDCP data-recovery procedure, for RLC AM
  Ciphering and deciphering
  Timer-based SDU discard in uplink.

The RLCs 962a and 962b may perform an ARQ operation and the like by reconfiguring a PDCP PDU in an appropriate size. The main functions of the RLCs are summarized as follows.

Transfer of upper layer PDUs
  Error correction through ARQ (only for AM data transfer)
  Concatenation, segmentation and reassembly of RLC SDUs (only for UM and AM data transfer)
  Re-segmentation of RLC data PDUs (only for AM data transfer)
  Reordering of RLC data PDUs (only for UM and AM data transfer
  Duplicate detection (only for UM and AM data transfer)
  Protocol error detection (only for AM data transfer)
  RLC SDU discard (only for UM and AM data transfer
  RLC re-establishment The MACs 963a and 963b may be connected to multiple RLC-layer devices configured in one UE, multiplex RLC PDUs into a MAC PDU, and demultiplex RLC PDUs from an MAC PDU. The main functions of the MACs may be summarized as follows.

Mapping between logical channels and transport channels
  Multiplexing/demultiplexing of MAC SDUs belonging to one or different logical channels into/from transport blocks (TB) delivered to/from the physical layer on transport channels
  Scheduling information reporting
  Error correction through HARQ
  Priority handling between logical channels of one UE
  Priority handling between UEs by means of dynamic scheduling
  MBMS service identification
  Transport format selection
  Padding PHYs 964a and 964b may channel-encode and modulate higher-layer data, generate OFDM symbols from the modulated data, and transmit the OFDM symbols on a radio channel. Alternatively, the PHYs 964a and 964b may demodulate an OFDM symbol received on a radio channel, channel-decode the demodulated OFDM symbol, and provide the channel-decoded OFDM symbol to the higher layer.

Figure 9B:
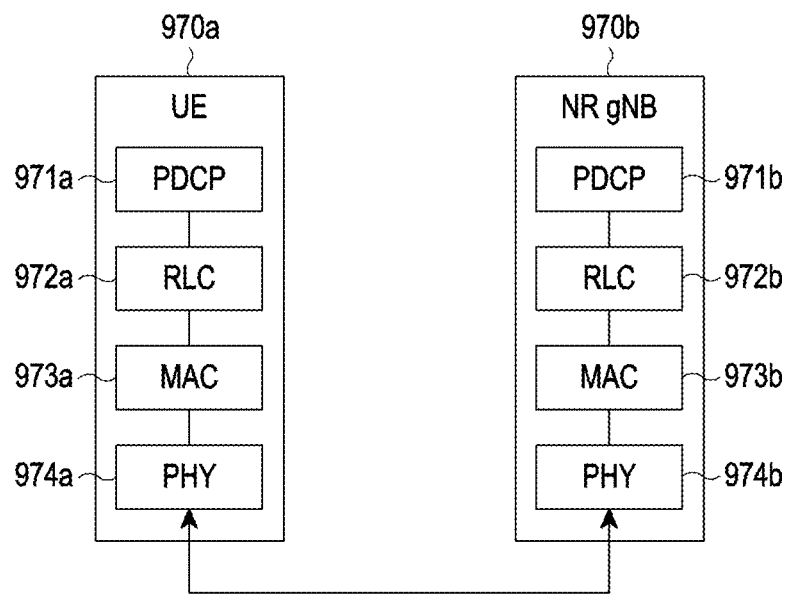
FIG. 9B illustrates a diagram of a radio protocol architecture in a next-generation mobile communication system according to various embodiments of the disclosure.

FIG. 9B illustrates a diagram of the radio protocol architecture of a next-generation mobile communication system according to various embodiments of the disclosure.

Referring to FIG. 9B, the radio protocols of the next-generation mobile communication system may include NR PDCPs 971a and 971b, NR RLCs 972a and 972b, and NR MACs 973a and 973b in a UE 970a and an NR gNB 970b. While not shown, the radio protocols of the next-generation mobile communication system may further include a service data adaptation protocol (SDAP) in each of the UE 970a and the NR gNB 970b. For example, the SDAP may manage radio bearer allocation based on the quality of service (QoS) of user data.

The main functions of the NR PDCPs 971a and 971b may include a part of the following functions.

Header compression and decompression: ROHC only
  Transfer of user data
  In-sequence delivery of upper layer PDUs
  PDCP PDU reordering for reception
  Duplicate detection of lower layer SDUs
  Retransmission of PDCP SDUs
  Ciphering and deciphering
  Timer-based SDU discard in uplink Among the above functions, the reordering function of the NR PDCPs refers to a function of reordering PDPC PDUs received from a lower layer based on PDCP sequence numbers (SNs). The reordering function may include a function of transferring data in a rearranged order, a function of reordering PDCP PDUs and recording lost PDCP PDUs, a function of transmitting a status report about the lost PDCP PDUs to a transmitting side, and a function of requesting retransmission of the lost PDCP PDUs.

The main functions of the NR RLCs 972a and 972b may include part of the following functions.

Transfer of upper layer PDUs
  In-sequence delivery of upper layer PDUs
  Out-of-sequence delivery of upper layer PDUs
  Error correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment Among the above functions, the in-sequence delivery function of the NR RLCs refers to a function of transferring RLC SDUs received from a lower layer to a higher layer in order. When multiple RLC SDUs divided from one RLC SDU are received, the in-sequence delivery function may include a function of reassembling the RLC SDUs and transferring the reassembled RLC SDUs, a function of reordering the received RLC SDUs based on RLC SNs or PDCP SNs, a function of reordering RLC PDUs and recording lost RLC PDUs, a function of transmitting a status report about the lost RLC PDUs to the transmitting side, a function of requesting retransmission of the lost RLC PDUs, and a function of, in the presence of a lost RLC SDU, transferring only RLC SDUs received until before the lost RLC SDU in order to the higher layer, a function of transferring all RLC SDUs received before the timer starts in order to the higher layer, upon expiration of the timer, despite the presence of a lost RLC SDU, or a function of transferring all received RLC SDUs in order to the higher layer, upon expiration of the timer, despite the presence of a lost RLC SDU. The out-of-sequence delivery function of the NR RLCs refers to a function of transferring RLC SDUs received from the lower layer to the higher layer irrespective of an order. The out-of-sequence delivery function may include a function of, upon receipt of multiple RLC SDUs divided from one original RLC SDU, reassembling the RLC SDUs and transferring the reassembled RLS SDUs, and a function of storing the RLS SNs or PDCP SNs of the received RLC PDUs and recording lost RLC PDUS by ordering.

The NR MACs 973a and 973b may be connected to multiple NR RLC layers configured in one UE, and the main functions of the NR MACs may include a part of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding NR PHYs 974a and 974b may channel-encode and modulate higher-layer data, generate OFDM symbols from the modulated data, and transmit the OFDM symbols on a radio channel. Alternatively, the NR PHYs 974a and 974b may demodulate an OFDM symbol received on a radio channel, channel-decode the demodulated OFDM symbol, and provide the channel-decoded OFDM symbol to the higher layer.

TABLE 2 describes information which may be included in a MAC header.

| Variable | Usage |
|---|---|
| LCID | LCID may represent the ID of an RLC entity which has generated an RLC PDU (or MAC SDU), received from the higher layer. Alternatively, LCID may represent a MAC control element (CE) or padding. A different LCID may be defined according to a transmitted channel. For example, a different LCID may be defined according to a DL-SCH, a UL-SCH, or an MCH. |
| L | L represents the length of a MAC SDU, and may represent the length of a MAC CE which is variable. For a MC CE of a fixed length the L-field may be omitted. For some reason, the L-field may be omitted. This reason is that the size of a MAC SDU is fixed, a transmitting side indicates the size of the MAC SDU to a receiving side, or the receiving side may calculate the length of the MAC SDU. |
| F | F indicates the size of the L-field. In the absence of the L-field, F may be omitted. In the presence of the L-field, F may restrict the size of the L-field to a predetermined size. |
| F2 | F2 indicates the size of the L-field. In the absence of the L-field, F2 may be omitted. In the presence of the F2-field, F2 may restrict the size of the L-field to a size different from the size indicated by the F-field. For example, the F2-field may indicate a larger size than the size indicated by the F-field. |
| E | E indicates whether another header is present in the MAC header. For example, when E is set to 1, variables of another MAC header may follow. However, when E is set to 0, a MAC SDU, a MAC CE, or a padding may follow. |
| R | Reserved bits. |

Referring to FIG. 9C, according to various embodiments of the disclosure, a UE 900 (e.g., the electronic device 101) may configure a PDCP entity 901, an RLC entity 902, a MAC entity 903, and a PHY entity 904. The PDCP entity 901, the RLC entity 902, the MAC entity 903, and the PHY entity 904 may be based on radio protocols of the LTE system or radio protocols of the NR system. For example, when the UE 900 transmits and receives LTE-based data, the UE 900 may configure the PDCP entity 901, the RLC entity 902, the MAC entity 903, and the PHY entity 904 based on the radio protocols of the LTE system. When the UE 900 transmits and receives NR-based data, the UE 900 may configure the PDCP entity 901, the RLC entity 902, the MAC entity 903, and the PHY entity 904 based on the radio protocols of the NR system.

For example, as illustrated in FIG. 9C, the PDCP entity 901 may provide PDCP PDUs 922, 924, and 926 by further including PDCP headers 921, 923, and 925 in respective PDCP SDUs 914, 915, and 916 based on data 911, 912, and 913 which are IP packets. PDCP header information provided by an LTE PDCP entity may be different from PDCP header information provided by an NR PDCP entity.

The RLC entity 902 may provide RLC PDUs 933 and 936 by adding RLC headers 931 and 934 respectively to first data 932 and second data 935 obtained by reconfiguring the RLC SDUs 922, 924, and 926. LTE-based RLC header information may be different from NR-based RLC header information.

For example, the MAC entity 902 may provide a MAC PDU 943 by adding a MAC header 941 and a padding 942 to a MAC SDU 933. The MAC PDU 943 may be processed as a transport block 951 in the PHY layer 904. The transport block 951 may be processed into slots 952, 953, 954, 955, and 956.

Figure 9D:
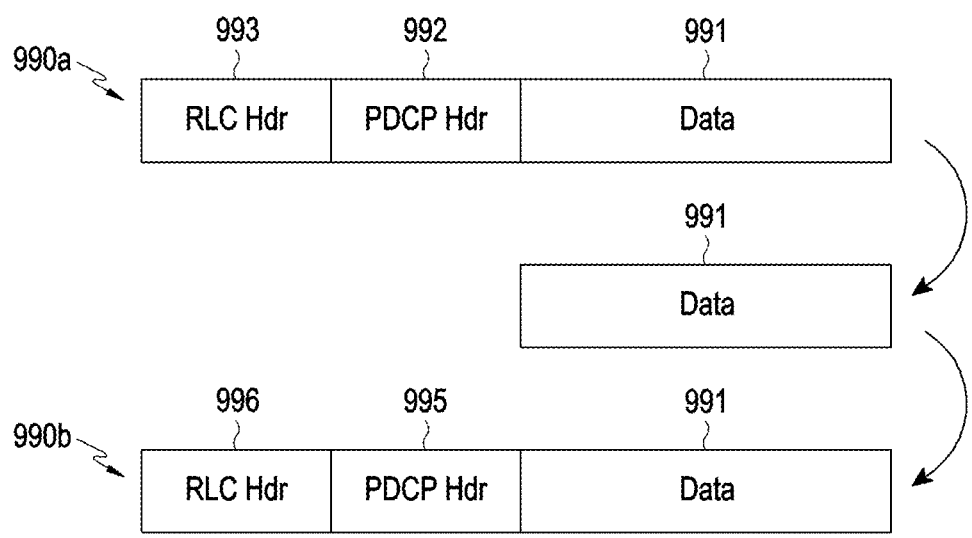
FIG. 9D illustrates a diagram of a reverse operation according to various embodiments of the disclosure.

FIG. 9D illustrates a diagram of a reverse operation according to various embodiments of the disclosure.

According to various embodiments of the disclosure, for example, as illustrated in FIG. 8, the electronic device 101 may determine whether to transmit data buffered in the buffer associated with the SCG in operation 805 and convert the data of the buffer to an MCG format in operation 807. For example, the electronic device 101 may store an RLC PDU 990a in the buffer. For example, the RLC PDU 990a may be provided by the NR PDCP and the NR RLC. The RLC PDU 990a may include data 991 (or an NR PDCP SDU), an NR PDCP header 992, and an NR RLC header 993. For example, the RLC PDU 990a may be stored in a buffer of the second communication processor 214.

The electronic device 101 may extract the data 991 from the RLC PDU 990a. The electronic device 101 may provide an RLC PDU 990b by reflecting an LTE PDCP header 995 and an LTE RLC header 996 in the extracted data 991. The electronic device 101 may provide the RLC PDU 990b to the LTE MAC and transmit the same to an LTE eNB. For example, the data 991 may be transferred from the second communication processor 214 to the first communication processor 212, and the first communication processor 212 may provide the RLC PDU 990b based on the data 991. Alternatively, the second communication processor 214 may extract the data 991, generate the RLC PDU 990b based on the data 991, and transmit the generated RLC PDU 990b to the first communication processor 212.

Figure 10:
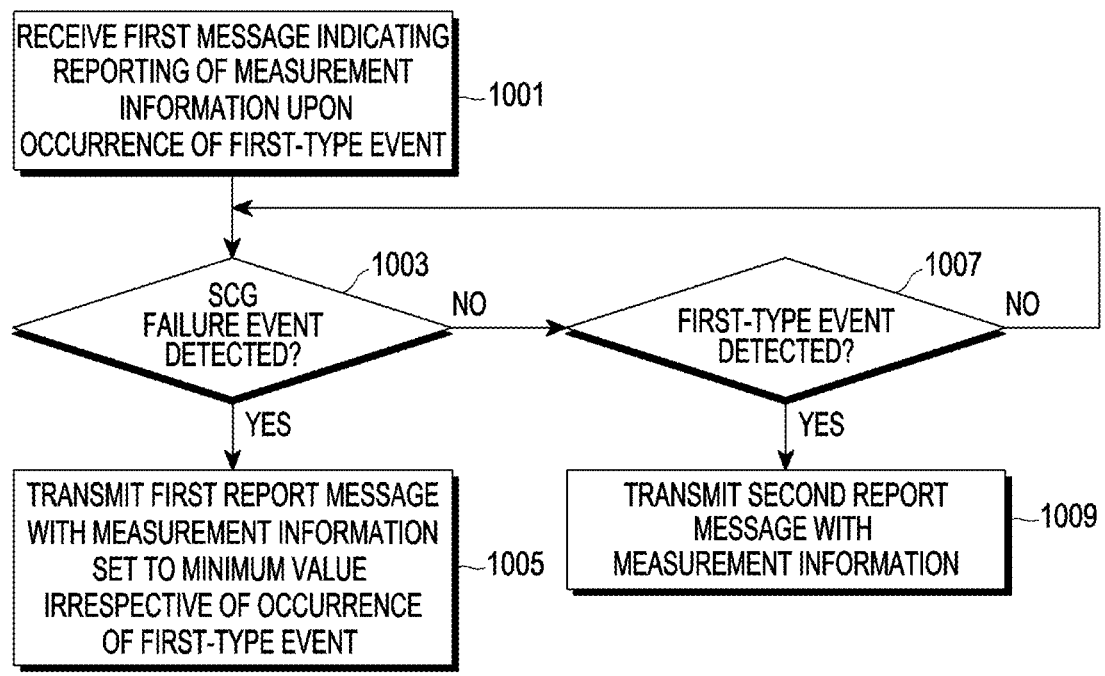
FIG. 10 illustrates a flowchart of a method of operating an electronic device according to various embodiments of the disclosure.

FIG. 10 illustrates a flowchart of a method of operating an electronic device according to various embodiments of the disclosure.

According to various embodiments of the disclosure, the electronic device 101 (e.g., at least one communication processor) may receive a first message indicating reporting of measurement information when a first-type event occurs in operation 1001. The electronic device 101 may receive, for example, a first message (e.g., RRC connection reconfiguration) indicating a reporting condition from an MN. The electronic device 101 may measure information associated with an SN specified in the first message and may be configured to transmit a report message to the MN when it is identified that the report condition is satisfied. Then, the electronic device 101 may transmit data through an uplink path associated with an SCG.

According to various embodiments of the disclosure, in operation 1003, the electronic device 101 may identify whether an event indicating an SCG failure has been detected. If an SCG failure has been detected (Yes in operation 1003), the electronic device 101 according to various embodiments of the disclosure may transmit a first report message in which measurement information associated with the SCG (e.g., at least one of an RSRP or an RSRQ) is set to a minimum value irrespective of the occurrence of the first-type event. The electronic device 101 may set the measurement information associated with the SCG to any value below a specific threshold, instead of the minimum value, and the value set as the measurement information is not limited. Accordingly, the MN may be induced to stop communication with the SCG. For example, the first-type event may be "serving becomes worse than threshold: A2". The electronic device 101 may be configured to report a measurement result when a signal from a current serving node is less than a specific value. When an SCG failure has been detected, the electronic device 101 may transmit a report message in which the measurement information is set to the minimum value to the MN when an event A2 is detected. However, in various embodiments of the disclosure, even when the event A2 is not detected, the electronic device 101 may transmit the report message in which the measurement information is set to the minimum value to the MN.

According to various embodiments, when an SCG failure has not been detected (No in operation 1003), the electronic device 101 may identify whether the first-type event has been detected in operation 1007. According to various embodiments of the disclosure, when the first-type event has been detected (Yes in operation 1007), the electronic device 101 may transmit a second report message including measurement information to the MN in operation 1009. According to various embodiments of the disclosure, when the first-type event has not been detected (No in operation 1007), the electronic device 101 may identify whether an SCG failure has been detected again in operation 1003.

Figure 11:
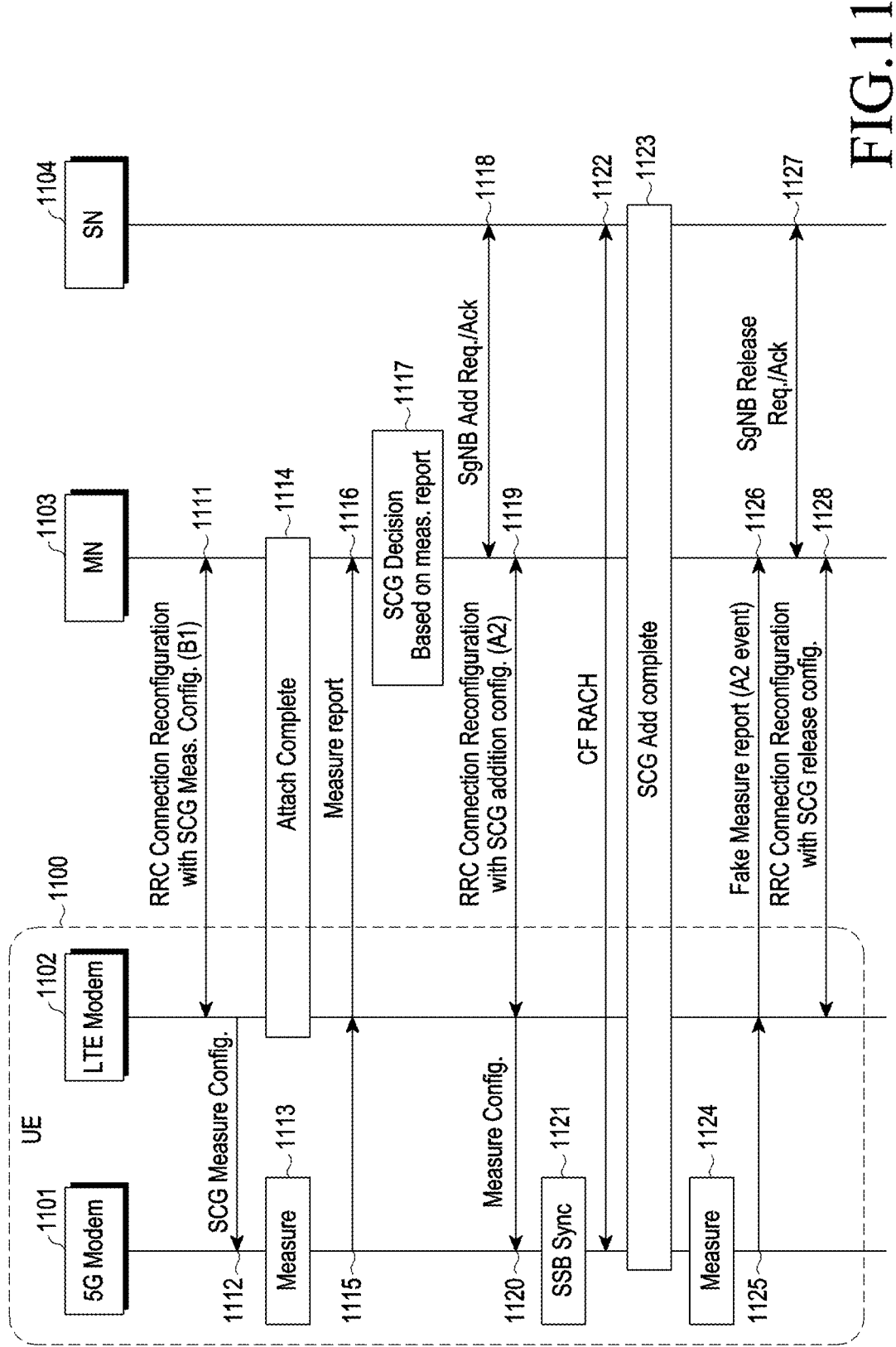
FIG. 11 illustrates a diagram of a signal flow for a method of operating a UE, a master node (MN), and a secondary node (SN) according to various embodiments of the disclosure.

FIG. 11 illustrates a diagram of a signal flow for a method of operating a UE, an MN, and an SN according to various embodiments.

According to various embodiments of the disclosure, a UE 1100 (e.g., the electronic device 101) may include a 5G modem 1101 (e.g., the second communication processor 214 of FIG. 2A) and an LTE modem 1102 (e.g., the first communication processor 212 of FIG. 2A). In operation 1111, the LTE modem 1102 may perform RRC connection reconfiguration with an MN 1103 so that an SCG measurement information (SCG Meas.) reporting condition is configured as an event B1. Here, the event B1 may represent an event in which measurement information corresponding to an inter-RAT neighbor exceeds a threshold. In operation 1112, the LTE modem 1102 may configure an SCG measurement reporting condition. The 5G modem 1101 may perform a measurement in operation 1113. In addition, the LTE modem 1102 may complete attachment with the MN 1103 in operation 1114. When it is identified that the event B1 has been satisfied, the 5G modem 1101 and the LTE modem 1102 may transmit a measurement report to the MN 1103 in operations 1115 and 1116. For example, the electronic device 101 may transmit cell identification information (or node identification information) for the measurement exceeding the threshold to the MN 1103.

In operation 1117, the MN 1103 may determine an SCG based on the measurement report. For example, the MN 1103 may select an SN 1104. The MN 1103 may request SgNB addition to the SN 1104 and receive an ACK for the request in operation 1118. The MN 1103 may perform an RRC connection reconfiguration with SCG including a reporting condition of an event A2 with the UE 1100 in operation 1119. The 5G modem 1101 may configure a reporting condition in operation 1120. In operation 1121, the 5G modem 1101 may perform SSB synchronization. The UE 1100 may perform a contention-free (CF) RACH operation with the SN 1104 in operation 1122. In operation 1123, the UE 1100 may complete the SCG addition with the MN 1103 and the SN 1104.

In operation 1124, the UE 1100 performs measurement and detects the event A2 in which a strength corresponding to a serving cell (e.g., the SN 1104) is less than a threshold. In operations 1125 and 1126, the UE 1100 may transmit a fake measurement report to the MN 1103 in response to detection of the event A2. In the false measurement report, at least one of an RSRP or an RSRQ may be set to a lowest value. As described above, the RSRP or the RSRQ may be set to, but not limited to, any value below the threshold. Alternatively, the UE 1100 may transmit the false measurement report to the MN 1103 in response to the SCG failure without the event A2 being detected. In operation 1127, the MN 1103 and the SN 1104 may transmit and receive an SgNB release request/ACK. The MN 1103 may perform an RRC connection reconfiguration associated with SCG release with the UE 1100 in operation 1128.

Figure 12A:
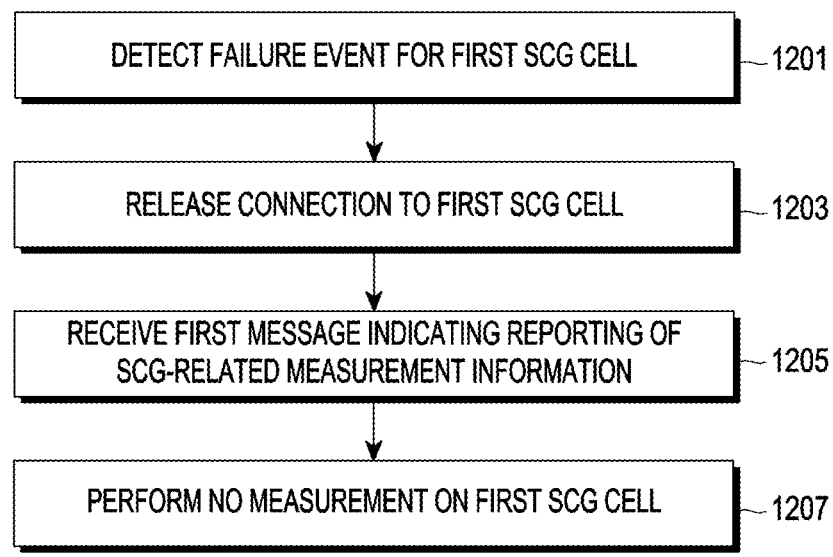
FIG. 12A illustrates a flowchart of a method of operating an electronic device according to various embodiments of the disclosure.

FIG. 12A illustrates a flowchart of a method of operating an electronic device according to various embodiments of the disclosure.

In operation 1201, the electronic device 101 (e.g., at least one communication processor) according to various embodiments of the disclosure may detect a failure event for a first SCG cell. As described above, the electronic device 101 may identify that a failure (e.g., an SCG RLC failure) has occurred in an SCG, for example, when the number of RLC retransmissions exceeds a threshold, or based on reception of an indication indicating an SCG failure. The failure event of the SCG is not limited.

According to various embodiments of the disclosure, in operation 1203, the electronic device 101 may release the connection to the first SCG cell. For example, as described with reference to FIG. 11, the electronic device 101 may transmit to the MN a measurement report in which measurement information corresponding to the first SCG cell is set to a minimum value, to induce the MN to release the connection to the SCG cell. As described above, the measurement information may be set without limitation as long as it is a value below any threshold. According to various embodiments of the disclosure, in operation 1205, the electronic device 101 may receive a first message indicating reporting of SCG-associated measurement information. For example, the electronic device 101 may receive an RRC connection reconfiguration including an event B1 from the MN. The electronic device 101 may not perform measurement on the first SCG in which the failure event was detected. Accordingly, the electronic device 101 may not report the measurement information about the first SCG to the MN, and reconnection to the first SCG may be limited. The electronic device 101 may not perform the measurement on the first SCG for a specified time and may perform the measurement on the first SCG when the specified time expires. When the event B1 in which the measurement of the first SCG exceeds the threshold is detected, the electronic device 101 may transmit a measurement report including information indicating the first SCG and the measurement to the MN.

Figure 12B:
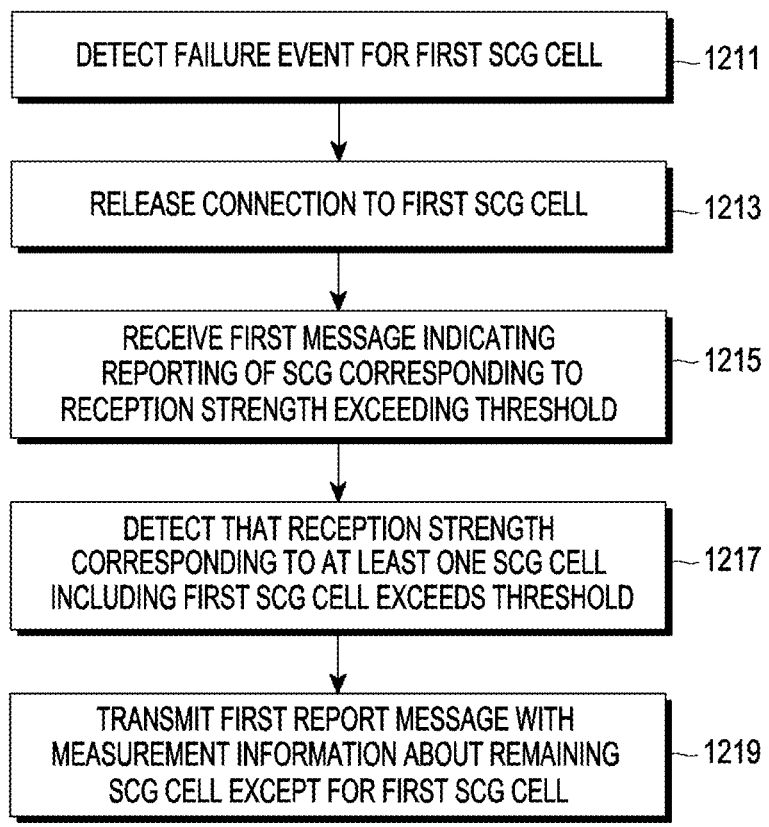
FIG. 12B illustrates a flowchart of a method of operating an electronic device according to various embodiments of the disclosure.

FIG. 12B illustrates a flowchart of a method of operating an electronic device according to various embodiments of the disclosure. Operations similar to those of FIG. 12A will be briefly described.

In operation 1211, the electronic device 101 (e.g., at least one communication processor) according to various embodiments of the disclosure may detect a failure event for a first SCG cell. According to various embodiments of the disclosure, the electronic device 101 may release the connection to the first SCG cell in operation 1213. According to various embodiments of the disclosure, the electronic device 101 may receive a first message indicating reporting of an SCG corresponding to a reception strength exceeding a threshold in operation 1215. For example, the electronic device 101 may receive a first message indicating reporting of measurement information when an event B1 occurs.

According to various embodiments of the disclosure, the electronic device 101 may identify that a reception strength corresponding to at least one SCG cell including the first SCG cell exceeds a threshold in operation 1217. According to various embodiments of the disclosure, the electronic device 101 may transmit a first report message including measurement information about the remaining SCG cells except for the first SCG cell to the MN in operation 1219. After a preset time exceeds, when the reception strength corresponding to the first SCG cell exceeds the threshold, the electronic device 101 may transmit a report message including measurement information about the first SCG cell to the MN.

Figure 13:
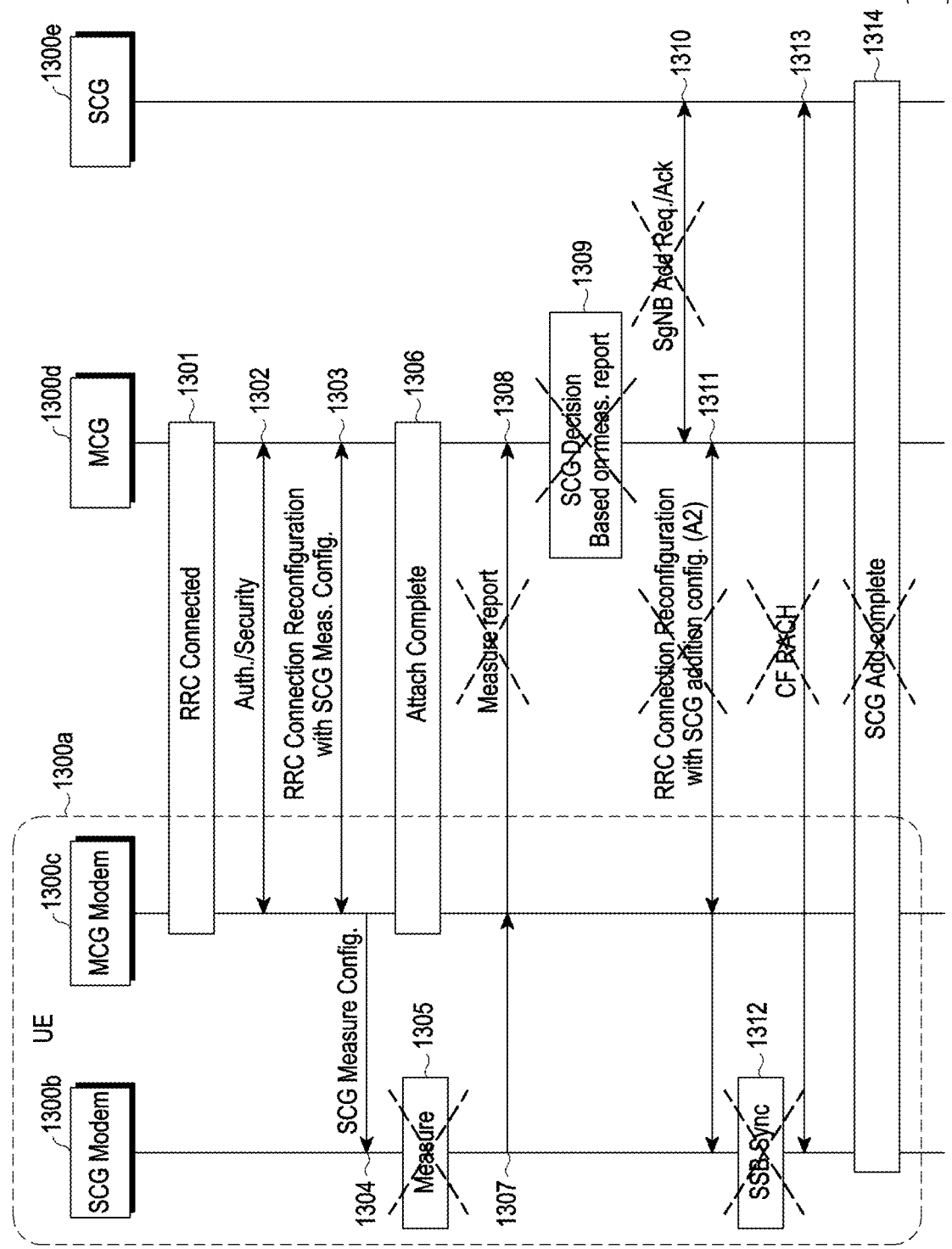
FIG. 13 illustrates a diagram of a signal flow for a method of operating a UE, a master cell group (MCG), and a secondary cell group (SCG) according to various embodiments of the disclosure.

FIG. 13 illustrates a diagram of a signal flow for operations of a UE, an MCG, and an SCG according to various embodiments of the disclosure.

A UE 1300a (e.g., the electronic device 101) according to various embodiments of the disclosure may include an SCG modem 1300b and an MCG modem 1300c. In operation 1301, the MCG modem 1300c may establish an RRC connection with an MCG 1300d. In operation 1302, the MCG modem 1300c may perform an authentication/security procedure with the MCG 1300d. In operation 1303, the MCG modem 1300c may perform an RRC connection reconfiguration associated with an SCG measurement configuration with the MCG 1300d. The SCG modem 1300b may perform SCG measurement configuration in operation 1304. For example, the SCG measurement configuration may be to report measurement information upon detection of an event B1. However, the UE 1300b may not perform measurement for a predetermined time with respect to a node in which the SCG failure has occurred in operation 1305. Accordingly, operation 1306 for completing attachment, operations 1307 and 1308 for transmitting a measurement report, operation 1309 for selecting an SCG, operation 1310 for transmitting and receiving an SgNB addition request/ACK, operation 1311 for RRC connection reconfiguration, operation 1312 for SSB synchronization, operation 1313 for performing a CF RACH procedure, and operation 1314 for completing SCG addition may not be performed. Accordingly, re-establishment of a connection to the SCG 1300e in which the failure was detected may be prevented.

Figure 14:
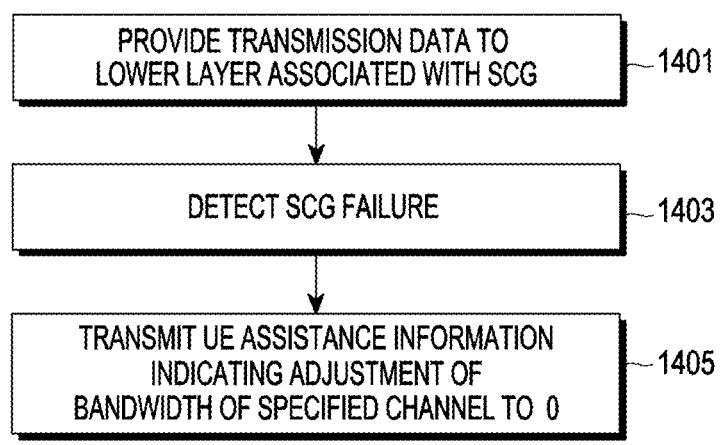
FIG. 14 illustrates a flowchart of a method of operating an electronic device according to various embodiments of the disclosure.

FIG. 14 illustrates a flowchart of a method of operating an electronic device according to various embodiments of the disclosure.

In operation 1401, the electronic device 101 (e.g., at least one communication processor) according to various embodiments of the disclosure may provide transmission data to a lower layer associated with an SCG. For example, the electronic device 101 may set up a split bearer and transmit the transmission data through an uplink path of the SCG configured as a primary path.

According to various embodiments of the disclosure, in operation 1403, the electronic device 101 may detect an SCG failure. According to various embodiments of the disclosure, the electronic device 101 may transmit UE assistance information indicating adjustment of the bandwidth of a specified channel to 0 to an MN in operation 1405. For example, the electronic device 101 may request the MN to adjust the bandwidth of FR2 (e.g., a frequency band at or above 24 GHz) to 0, thereby inducing the MN to terminate the SCG communication in FR2.

According to various embodiments of the disclosure, an electronic device (e.g., the electronic device 101) may include a first communication processor (e.g., the first communication processor 212) supporting first network communication with a first network (e.g., the first network 292), and a second communication processor (e.g., the second communication processor 214) supporting second network communication with a second network (e.g., the second network 294) different from the first network (e.g., the first network 292). When both of the first network communication and the second network communication are set to a data transmittable state, the second communication processor (e.g., the second communication processor 214) may be configured to transmit transmission data based on the second network communication selected as a primary path from between the first network communication and the second network communication, when the size of the transmission data is less than a predetermined threshold. In response to detection of a failure in the second network communication, the first communication processor (e.g., the first communication processor 212) may be configured to transmit the transmission data based on the first network communication, irrespective of whether the size of the transmission data is equal to or larger than the predetermined threshold.

According to various embodiments of the disclosure, when both of the first network communication and the second network communication are set to the data transmittable state, the first communication processor (e.g., the first communication processor 212) and the second communication processor (e.g., the second communication processor 214) may be configured to transmit the transmission data based on the first network communication and the second network communication, based on the size of the transmission data being equal to or larger than the predetermined threshold.

According to various embodiments of the disclosure, both of the first network communication and the second network communication may be set to the data transmittable state, based on a split bearer.

According to various embodiments of the disclosure, a transmitting PDCP entity of the electronic device (e.g., the electronic device 101) may be associated with both of a first RLC entity corresponding to the first network communication and a second RLC entity corresponding to the second network communication, based on the split bearer.

According to various embodiments of the disclosure, the transmission data may be transmitted based on the first network communication, based on an MCG radio bearer.

According to various embodiments of the disclosure, the transmitting PDCP entity of the electronic device (e.g., the electronic device 101) may be associated with a first RLC entity corresponding to the first network communication, based on the MCG radio bearer.

According to various embodiments of the disclosure, when it is determined to transmit non-transmitted data which has not been transmitted and has been stored in a buffer of the second communication processor (e.g., the second communication processor 214) due to a failure in the second network communication, the first communication processor (e.g., the first communication processor 212) may be configured to obtain non-transmitted data converted to a format corresponding to the first network communication, and transmit the converted non-transmitted data based on the first network communication.

According to various embodiments of the disclosure, the converted non-transmitted data may be provided based on identification of data supported by the second network communication in the non-transmitted data including information and the data supported by the second network communication, and addition of information supported by the first network communication to at least part of the identified data.

According to various embodiments of the disclosure, the non-transmitted data may be an RLC PDU of the second network communication. The information supported by the second network communication may include at least one of RLC header information of the second network communication or PDCP header information of the second network communication. The converted non-transmitted data may be an RLC PDU of the first network communication. The information supported by the first network communication may include at least one of RLC header information of the first network communication or PDCP header information of the first network communication.

According to various embodiments of the disclosure, a method of operating an electronic device (e.g., the electronic device 101) including a first communication processor (e.g., the first communication processor 212) supporting first network communication with a first network and a second communication processor (e.g., the second communication processor 214) supporting second network communication with a second network different from the first network may include, when both of the first network communication and the second network communication are set to a data transmittable state, transmitting transmission data based on the second network communication selected as a primary path from between the first network communication and the second network communication by the second communication processor (e.g., the second communication processor 214), when the size of the transmission data is less than a predetermined threshold, and transmitting the transmission data based on the first network communication in response to detection of a failure in the second network communication by the first communication processor (e.g., the first communication processor 212), irrespective of whether the size of the transmission data is equal to or larger than the predetermined threshold.

According to various embodiments of the disclosure, the method may further include, when both of the first network communication and the second network communication are set to the data transmittable state, transmitting the transmission data based on the first network communication and the second network communication, based on the size of the transmission data being equal to or larger than the predetermined threshold, by the first communication processor and the second communication processor (e.g., the second communication processor 214).

According to various embodiments of the disclosure, both of the first network communication and the second network communication may be set to the data transmittable state, based on a split bearer.

According to various embodiments of the disclosure, a transmitting PDCP entity of the electronic device may be associated with both of a first RLC entity corresponding to the first network communication and a second RLC entity corresponding to the second network communication, based on the split bearer.

According to various embodiments of the disclosure, the transmission data may be transmitted based on the first network communication, based on MCG radio bearer.

According to various embodiments of the disclosure, the transmitting PDCP entity of the electronic device may be associated with a first RLC entity corresponding to the first network communication, based on the MCG radio bearer.

According to various embodiments of the disclosure, when it is determined to transmit non-transmitted data which has not been transmitted and has been stored in a buffer of the second communication processor due to a failure in the second network communication, the method may further include obtaining non-transmitted data converted to a format corresponding to the first network communication by the first communication processor, and transmitting the converted non-transmitted data based on the first network communication by the first communication processor. Before the conversion, the non-transmitted data may have a format corresponding to the second network communication.

According to various embodiments of the disclosure, the converted non-transmitted data may be provided based on identification of data supported by the second network communication in the non-transmitted data including information and the data supported by the second network communication, and addition of information supported by the first network communication to at least part of the identified data.

According to various embodiments of the disclosure, an electronic device (e.g., the electronic device 101) may include a first communication processor (e.g., the first communication processor 212) supporting first network communication with a first network, and a second communication processor (e.g., the second communication processor 214) supporting second network communication with a second network different from the first network. When both of the first network communication and the second network communication are set to a data transmittable state, the second communication processor (e.g., the second communication processor 214) may be configured to transmit transmission data based on the second network communication selected as a primary path from between the first network communication and the second network communication, when the size of the transmission data is less than a predetermined threshold. In response to detection of a failure in the second network communication, the first communication processor (e.g., the first communication processor 212) may be configured to transmit, to a first node corresponding to the first network communication, a report signal with at least one parameter indicating the strength of a signal of the second network communication, measured by the electronic device to a lowest value.

According to various embodiments of the disclosure, when the first communication processor (e.g., the first communication processor 212) receives information indicating a first event of instructing transmission of the report signal from the first node, the first communication processor (e.g., the first communication processor 212) may be configured to transmit the report signal to the first node, when occurrence of the first event is detected, and to transmit the report signal to the first node, when the occurrence of the first event is not detected and the failure in the second network communication is detected.

According to various embodiments of the disclosure, upon detection of a second event of the strength of a signal output from a neighbor node associated with the second network communication being equal to or larger than a threshold, when the first communication processor (e.g., the first communication processor 212) receives an instruction to transmit a second report signal, the first communication processor (e.g., the first communication processor 212) may be configured not to perform measurement for a node in which the failure is detected or not to transmit the second report signal, even though the strength of a signal output from the node in which the failure is detected is equal to or larger than the threshold.

As is apparent from the foregoing description, according to various embodiments of the disclosure, an electronic device and a method of operating the same may be provided, in which when with a split bearer set up, a failure in a network of a primary path has been detected, a bearer for data transmission is switched to a bearer set up in a secondary path and data is transmitted through the bearer. Therefore, data may be transmitted over a network corresponding to the secondary path without uplink data delay.

According to various embodiments of the disclosure, an electronic device and a method of operating the same may be provided, in which when a failure has been detected in a network of a primary path, a measurement value of the network is set to a predetermined value and reported to an external electronic device. Accordingly, the network in which the failure has been detected may not be used anymore, or it may be induced not to further connect an SN according to a dual connectivity configuration (e.g., secondary-node addition).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory 136 or external memory 138) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device supporting dual connectivity comprising:
   a first communication processor supporting a first network communication with a first network; and
   a second communication processor supporting a second network communication with a second network different from the first network,
   wherein when both of the first network communication and the second network communication are set to a data transmittable state based on a split bearer, the second network communication is selected as a primary path from the first network communication and the second network communication, and the first network communication is selected as a secondary path from the first network communication and the second network communication,
   wherein the second communication processor is configured to transmit transmission data based on the second network communication selected as the primary path, when a size of the transmission data is less than a predetermined threshold, and
   wherein the first communication processor is configured to:
      based on the second network communication selected as the primary path and the first network communication selected as the secondary path, while a failure in the second network communication is not detected, be incapable of transmitting the transmission data based on the first network communication when the size of the transmission data is less than the predetermined threshold,
      based on the failure in the second network communication being detected, be capable of transmitting the transmission data based on the first network communication as the secondary path, both when the size of the transmission data is equal to or larger than the predetermined threshold and when the size of the transmission data is less than the predetermined threshold and maintaining the split bearer through the detected failure in the second network communication,
   wherein the second communication processor is configured to:
      based on the failure in the second network communication being detected, determine whether a time required to convert and transmit the buffered data is less than a remaining time of a packet discard timer,
      when it is determined to transmit data buffered in a buffer associated with the second communication processor and the time required to convert and transmit the buffered data is less than the remaining time of the packet discard timer, convert the buffered data to a first network communication format; and provide the converted data to the first communication processor for retransmitting the converted data, and
      when it is determined not to transmit data buffered in the buffer associated with the second communication processor and the time required to convert and transmit the buffered data is equal to or larger than the remaining time of the packet discard timer, discard the buffered data.

2. The electronic device of claim 1, wherein while the failure in the second network communication is not detected, the first communication processor and the second communication processor are configured to transmit the transmission data based on the first network communication and the second network communication, based on the size of the transmission data being equal to or larger than the predetermined threshold.

3. The electronic device of claim 1, wherein a transmitting packet data convergence protocol (PDCP) entity of the electronic device is associated with both of a first radio link control (RLC) entity corresponding to the first network communication and a second RLC entity corresponding to the second network communication, based on the split bearer.

4. The electronic device of claim 1, wherein the transmission data is transmitted based on the first network communication, based on a master cell group (MCG) radio bearer.

5. The electronic device of claim 4, wherein a transmitting PDCP entity of the electronic device is associated with a first RLC entity corresponding to the first network communication, based on the MCG radio bearer.

6. A method of operating an electronic device supporting dual connectivity including a first communication processor supporting first network communication with a first network and a second communication processor supporting second network communication with a second network different from the first network,
   wherein when both of the first network communication and the second network communication are set to a data transmittable state based on a split bearer, the second network communication is selected as a primary path from the first network communication and the second network communication, and the first network communication is selected as a secondary path from the first network communication and the second network communication,
   wherein the method further comprises:
      transmitting, by the second communication processor, transmission data based on the second network communication being selected as the primary path, when a size of the transmission data is less than a predetermined threshold, wherein based on the second network communication being selected as the primary path and the first network communication being selected as the secondary path, while a failure in the second network communication is not detected, the first communication processor is incapable of transmitting the transmission data based on the first network communication, when the size of the transmission data is less than the predetermined threshold;
      based on the failure in the second network communication being detected, determining whether a time required to convert and transmit data buffered in a buffer associated with the second communication processor is less than a remaining time of a packet discard timer;
      when it is determined to transmit the buffered data and the time required to convert and transmit the buffered data is less than the remaining time of the packet discard timer, converting the buffered data to a first network communication format, and providing the converted data to the first communication processor for retransmitting the converted data; and when it is determined not to transmit the buffered data and the time required to convert and transmit the buffered data is equal to or larger than the remaining time of the packet discard timer, discard the buffered data, and transmitting, by the first communication processor, the transmission data based on the first network communication as the secondary path, when the size of the transmission data is larger than the predetermined threshold and when the size of the transmission data is less than the predetermined threshold and maintaining the split bearer through the detected failure in the second network communication.

7. The method of claim 6, further comprising: while the failure in the second network communication is not detected, transmitting, by the first communication processor and the second communication processor, transmission data based on the first network communication and the second network communication, based on the size of the transmission data being equal to or larger than the predetermined threshold.

8. The method of claim 6, wherein a transmitting packet data convergence protocol (PDCP) entity of the electronic device is associated with both of a first radio link control (RLC) entity corresponding to the first network communication and a second RLC entity corresponding to the second network communication, based on the split bearer.

9. The method of claim 6, wherein the transmission data is transmitted based on the first network communication, based on a master cell group (MCG) radio bearer.

10. The method of claim 9, wherein a transmitting PDCP entity of the electronic device is associated with a first RLC entity corresponding to the first network communication, based on the MCG radio bearer.

* * * * *